(12) United States Patent
Ren et al.

(10) Patent No.: US 12,520,268 B2
(45) Date of Patent: Jan. 6, 2026

(54) POSITIONING METHOD, DEVICE, TERMINAL AND BASE STATION

(71) Applicant: DATANG MOBILE COMMUNICATIONS EQUIPMENT CO., LTD., Beijing (CN)

(72) Inventors: Xiaotao Ren, Beijing (CN); Bin Ren, Beijing (CN); Ren Da, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 473 days.

(21) Appl. No.: 18/020,077

(22) PCT Filed: Jul. 13, 2021

(86) PCT No.: PCT/CN2021/105998
§ 371 (c)(1),
(2) Date: Feb. 6, 2023

(87) PCT Pub. No.: WO2022/028213
PCT Pub. Date: Feb. 10, 2022

(65) Prior Publication Data
US 2023/0309049 A1    Sep. 28, 2023

(30) Foreign Application Priority Data
Aug. 7, 2020    (CN) .......................... 202010791660.1

(51) Int. Cl.
*H04W 64/00*    (2009.01)
*H04W 74/0833*  (2024.01)
*H04W 74/0836*  (2024.01)

(52) U.S. Cl.
CPC ....... *H04W 64/00* (2013.01); *H04W 74/0833* (2013.01); *H04W 74/0836* (2024.01)

(58) Field of Classification Search
None
See application file for complete search history.

(56) References Cited

U.S. PATENT DOCUMENTS

| 2020/0145955 A1 | 5/2020 | Opshaug et al. |
| 2021/0286085 A1 | 9/2021 | Quan |

(Continued)

FOREIGN PATENT DOCUMENTS

| CN | 101772159 A | 7/2010 |
| CN | 102307387 A | 1/2012 |

(Continued)

OTHER PUBLICATIONS

International Search Report for PCT/CN2021/105998 issued on Aug. 26, 2021 and its English Translation provided by WIPO.

(Continued)

*Primary Examiner* — Suhail Khan
(74) *Attorney, Agent, or Firm* — Ladas & Parry, LLP

(57) ABSTRACT

The present disclosure discloses a positioning method and device, a terminal and a base station. The positioning method is applied to a first network device, the first network device is one of a terminal and a network side device, the positioning method includes: sending first information related to a random access process, wherein the first information includes positioning information; wherein the positioning information includes at least one of the following information: an uplink positioning reference signal, configuration information of the uplink positioning reference signal, a downlink positioning reference signal, configuration information of the downlink positioning reference signal, a positioning measurement value, a positioning calculation result or terminal position information.

21 Claims, 9 Drawing Sheets

(56) References Cited

U.S. PATENT DOCUMENTS

2021/0329443 A1    10/2021   Si et al.
2023/0043012 A1*   2/2023   Huang .................. H04L 5/0007

FOREIGN PATENT DOCUMENTS

| CN | 110933715 A | 3/2020 |
| --- | --- | --- |
| CN | 111278088 A | 6/2020 |
| WO | 2020092714 A1 | 5/2020 |
| WO | 2020146739 A1 | 7/2020 |

OTHER PUBLICATIONS

Written Opinion for PCT/CN2021/105998 issued on Aug. 26, 2021 and its English Translation provided by WIPO.

International Preliminary Report on Patentibily for PCT/CN2021/105998 issued on Feb. 7, 2023 and its English translation provided by WIPO.

"FL Summary for Potential Positioning Enhancements" 3GPP TSG RAN WG1 Meeting #102-e, R1-2006972, e-meeting, May 25-Jun. 5, 2020, Source: Moderator (CATT),Agenda item: 8.5.3, all pages.

First Office Action and search report for the corresponding Chinese Patent Application No. 202010791660.1 issued on Jun. 8, 2023 by the Chinese Patent Office and its English Translation provided by foreign associate.

First Office Action and search report for the corresponding Taiwanese Patent Application No. 110125973 issued on Dec. 23, 2021, by the Taiwanese Patent Office and its English Translation provided by a foreign associate.

Extended European Search Report for the corresponding European Application No. 21852206.8 issued by the European Patent Office on Jan. 5, 2024.

"Positioning enhancements for RRC Idle and RRC Inactive state UE," 3GPP TSG RAN WG1 #101, R1-2003977, e-Meeting, May 25-Jun. 5, 2020, Agenda Item: 8.2.3, Source: Xiaomi Communications.

\* cited by examiner

Sending first information related to a random access process, wherein the first information includes positioning information;

The positioning information includes at least one of the following information:

an uplink positioning reference signal, configuration information of the uplink positioning reference signal, a downlink positioning reference signal, configuration information of the downlink positioning reference signal, a positioning measurement value, a positioning calculation result or terminal position information ⎯S110

FIG. 1

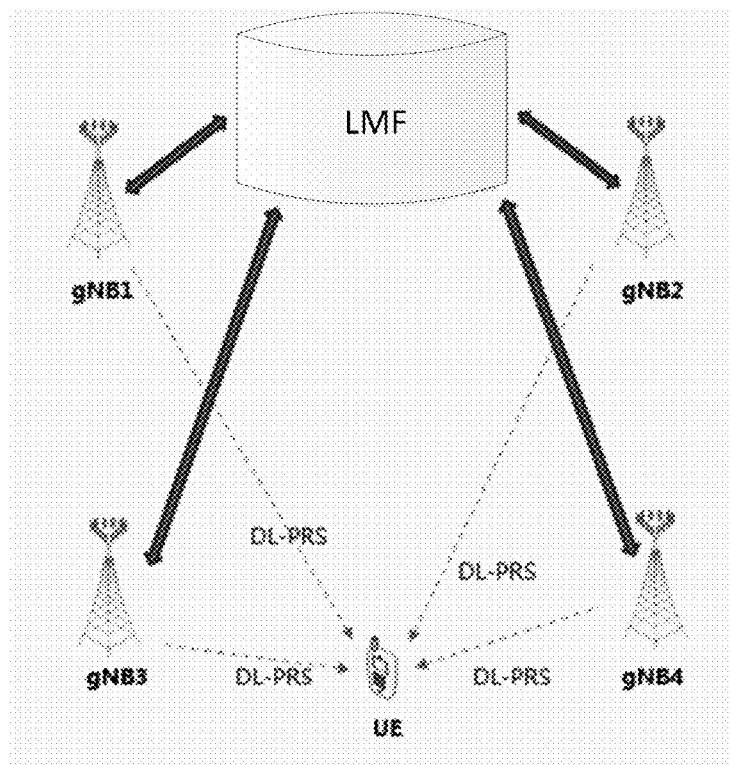

FIG. 2

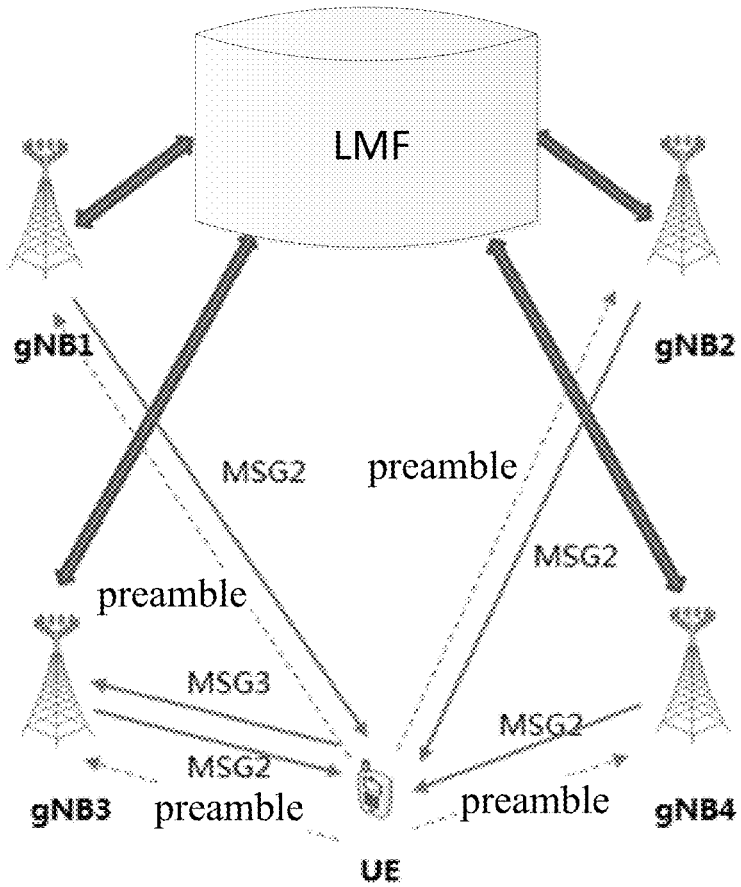

FIG. 8

Receiving first information related to a random access process sent by a first network device, wherein the first information includes positioning information, and the first network device is one of a terminal and a network side device that is different from the second network device;
Tthe positioning information includes at least one of the following information:
    an uplink positioning reference signal, configuration information of the uplink positioning reference signal, a downlink positioning reference signal, configuration information of the downlink positioning reference signal, a positioning measurement value, a positioning calculation result or terminal position information ⎯S910

FIG. 9

POSITIONING METHOD, DEVICE, TERMINAL AND BASE STATION

CROSS-REFERENCE TO RELATED APPLICATIONS

This application is the U.S. national phase of PCT Application No. PCT/CN2021/105998 filed on Jul. 13, 2021, which claims priority to the Chinese patent application No. 202010791660.1 filed on Aug. 7, 2020, the disclosures of which are incorporated herein by reference in their entireties.

TECHNICAL FIELD

The present disclosure relates to the field of wireless technology, in particular to a positioning method, a device, a terminal and a base station.

BACKGROUND

The technical solutions for downlink positioning in the New Radio (NR) access technology in the related art mainly include Downlink-Time Difference Of Arrival (DL-TDOA) positioning method based on the delay and Downlink-Angle of Departure (DL-AoD) positioning method based on the angle and other solutions. For the DL-TDOA time delay positioning method, the position of the terminal is estimated through the relative time delay between the base stations according to the difference in the propagation distance of the terminal relative to each base station. For the DL-AoD angle positioning method, the position of the terminal is determined through multiple angle parameters according to the position direction of the terminal relative to the base station.

For the above two positioning technology solutions, no matter which solution, the User Equipment (UE) needs to be in the radio resource control (RRC) connection state to perform the positioning process. If a UE in the RRC idle state or in the RRC inactive state needs to perform positioning, it must first enter the RRC_CONNECTED state, which will bring additional power consumption of the UE and increase the positioning delay.

SUMMARY

The present disclosure aims to provide a positioning method, a positioning device, a terminal and a network, so as to solve the problem in the related art that if a UE in the RRC idle state or in the RRC inactive state needs to perform positioning, it must first enter the RRC_CONNECTED state, which will bring additional power consumption of the UE and increase the positioning delay.

An embodiment of the present disclosure provides a positioning method, applied to a first network device, wherein the first network device is one of a terminal and a network side device, the positioning method includes: sending first information related to a random access process, wherein the first information includes positioning information; wherein the positioning information includes at least one of the following information: an uplink positioning reference signal, configuration information of the uplink positioning reference signal, a downlink positioning reference signal, configuration information of the downlink positioning reference signal, a positioning measurement value, a positioning calculation result or terminal position information.

In an embodiment of the present disclosure, the first network device is the terminal, and for a first type of random access process, the first information is at least one of a preamble, message 3 or message 5 in the first type of random access process; for a second type of random access process, the first information is message A in the second type of random access process.

In an embodiment of the present disclosure, the first network device is the network side device, and for a first type of random access process, the first information is at least one of message 2 or message 4 in the first type of random access process; for a second type of random access process, the first information is message B in the second type of random access process.

In an embodiment of the present disclosure, the positioning method further includes: receiving second information related to the random access process sent by a second network device, wherein the second information includes at least one of the positioning information; the second network device is one of the terminal and the network side device that is different from the first network device.

In an embodiment of the present disclosure, the first network device is the network side device, and for a first type of random access process, the second information is at least one of a preamble, message 3, or message 5 in the first type of random access process; for a second type of random access process, the second information is message A in the second type of random access process.

In an embodiment of the present disclosure, the first network device is the terminal, and for a first type of random access process, the second information is at least one of message 2 or message 4 in the first type of random access process; for a second type of random access process, the second information is message B in the second type of random access process.

In an embodiment of the present disclosure, the positioning method further includes: obtaining first assistance data sent by a location management function unit (LMF); wherein the first assistance data includes configuration information of at least one of the preamble, message 3, message 5 or message A sent by the terminal in the random access process; and/or obtaining second assistance data sent by the LMF; wherein the second assistance data includes configuration information of at least one of message 2, message 4, or message B sent by other network side devices in the random access process.

In an embodiment of the present disclosure, the first network device is the terminal, when a downlink positioning method is used and based on network positioning, the sending the first information related to the random access process, and receiving the second information related to the random access process sent by the second network device includes: after receiving the downlink positioning reference signal, sending, by the terminal, the first information carrying the positioning information; wherein the first information is at least one of message 3, message A or message 5, and the positioning information in the first information includes the positioning measurement value; after LMF completes position calculation according to the positioning measurement value, and outputs a positioning measurement calculation result and/or the terminal position information, receiving, by the terminal, the second information carrying the position information sent by the network side device; wherein the second information is message 2, message 4 or message B; the positioning information in the second information includes the positioning measurement calculation result and/or terminal position information.

In an embodiment of the present disclosure, the first network device is the terminal, an uplink positioning method is used and based on network positioning, the sending the first information related to the random access process, and receiving the second information related to the random access process sent by the second network device includes: sending, by the terminal, the first information; wherein the first information is a preamble, message 3, message 5 or message A, as the uplink positioning reference signal; after the network side device measures the preamble, message 3, message 5 or message A, reports the positioning measurement value to an LMF, the LMF completes the position calculation based on the positioning measurement value, and outputs the position measurement calculation result and/or the terminal position information, receiving, by the terminal, the second information carrying the positioning information sent by the network side device, wherein the second information is at least one of message 2, message 4 or message B, the positioning information in the second information includes the positioning measurement calculation result and/or terminal position information.

In an embodiment of the present disclosure, the first network device is the terminal, a downlink and uplink joint positioning method is used, and based on network positioning, the sending the first information related to the random access process, and receiving the second information related to the random access process sent by the second network device includes: after receiving the downlink positioning reference signal, sending, by the terminal, the first information carrying positioning information; wherein the first information is at least one of message 3, message A or message 5; the positioning information in the first information includes a first positioning measurement value; after the network side device obtains the first positioning measurement value, obtains a second positioning measurement value through message 3, message A or message 5, and reports the first positioning measurement value and the second positioning measurement value to a LMF, the LMF completes the positioning calculation based on the first positioning measurement value and the second positioning measurement value, and obtains the positioning measurement calculation result and/or terminal position information, receiving, by the terminal, the second information carrying the positioning information sent by the network side device; wherein the second information is at least one of message 2, message 4, or message B, and the positioning information in the second information includes the positioning measurement calculation result and/or terminal position information.

In an embodiment of the present disclosure, the first network device is the terminal, and a downlink positioning method is used and based on terminal positioning, the sending the first information related to the random access process, includes: after receiving the downlink positioning reference signal, sending, by the terminal, the first information carrying the positioning information; wherein the first information is at least one of message 3, message A or message 5, and the positioning information includes the positioning measurement calculation result and/or the terminal position information.

In an embodiment of the present disclosure, the first network device is the terminal, and an uplink positioning method is used and based on terminal positioning, the sending the first information related to the random access process and receiving the second information related to the random access process sent by the second network device includes: sending, by the terminal, a preamble, message 3, message 5 or message A as the uplink positioning reference signal; after the network side device measures the preamble, message 3, message 5 or message A, receiving, by the terminal, the second information carrying the positioning information sent by the network side device, wherein the second information is at least one of message 2, message 4 or message B, the positioning information in the second information includes the positioning measurement value; sending, by the terminal, the first information including the positioning information, wherein the first information is message 3, message A or message 5, and the positioning information in the first information includes the positioning measurement calculation result and/or the terminal position information.

In an embodiment of the present disclosure, the first network device is the terminal, and a downlink and uplink joint positioning is used and based on terminal positioning, the sending the first information related to the random access process, and receiving the second information related to the random access process sent by the second network device includes: sending, by the terminal, a preamble, message 3, message 5 or message A as the uplink positioning reference signal; receiving, by the terminal, second information carrying the positioning information sent by the network side device, wherein the second information is message 2, message 4 or message B; the positioning information in the second information includes a first positioning measurement value; after the terminal receives message 2, message 4 or message B, obtains a first positioning measurement value, and obtains a second positioning measurement value by measuring message 2, message 4 or message B; and completes positioning calculation according to the first positioning measurement value and the second positioning measurement value, sending, by the terminal the first information carrying the positioning information, wherein the first information is at least one of message 3, message A or message 5; the positioning information in the first information includes the positioning measurement calculation result and/or the terminal position information.

In an embodiment of the present disclosure, the first network device is the network side device, a downlink positioning method is used and based on network positioning, the sending the first information related to the random access process, and receiving the second information related to the random access process sent by the second network device includes: receiving, by the network side device, second information including the positioning information sent by the terminal; wherein the second information is at least one of message 3, message A, or message 5; the positioning information in the second information is the positioning measurement value; after the LMF completes position calculation according to the positioning measurement value, and outputs the position measurement calculation result and/or the terminal position information, sending, by the network side device, the first information carrying the position information; wherein the first information is message 2, message 4 or message B; the positioning information in the first information includes the positioning measurement calculation result and/or the terminal position information.

In an embodiment of the present disclosure, the first network device is the network side device, an uplink positioning method is used and based on network positioning, the sending first information related to a random access process includes: after the terminal sends a preamble, message 3, message 5 or message A as the uplink positioning reference signal, measuring, by the network side device, the preamble, message 3, message 5 or message A, and reporting the positioning measurement value to a LMF, the LMF completes positioning calculation based on the positioning measurement value, and outputs the positioning measurement calculation result and/or the terminal position information, sending, by the network side device, the first information carrying the positioning information, wherein the first information is at least one of message 2, message 4, or message B, and the positioning information in the first information includes the positioning measurement calculation result and/or the terminal position information.

In an embodiment of the present disclosure, the first network device is the network side device, a downlink and uplink joint positioning method is used, and based on network positioning, the sending the first information related to a random access process includes: after the terminal receives the downlink positioning reference signal and sends at least one of message 3, message A, or message 5 including a first positioning measurement value, obtaining, by the network side device, the first positioning measurement value, and obtaining a second positioning measurement value through message 3, message A or message 5, reporting the first positioning measurement value and the second positioning measurement value to LMF, the LMF completes positioning calculation based on the first positioning measurement value and the second positioning measurement value, and obtains the positioning measurement calculation result and/or the terminal position information, sending, by the network side device, the first information carrying the positioning information; wherein the first information is at least one of message 2, message 4 or message B, the positioning information in the first information includes the positioning measurement calculation result and/or the terminal position information.

In an embodiment of the present disclosure, the first network device is the network side device, and an uplink positioning method is used and based on terminal positioning, the sending the first information related to the random access process, and receiving the second information related to the random access process sent by the second network device includes: after the terminal sends a preamble, message 3, message 5 or message A as the uplink positioning reference signal, and the network side device measures the preamble, message 3, message 5 or message A, sending, by the network side device, the first information carrying the positioning information, wherein the first information is at least one of message 2, message 4, or message B, and the positioning information in the first information includes the positioning measurement value; receiving, by the network side device, second information including the positioning information sent by the terminal, wherein the second information is message 3, message A or message 5, and the positioning information in the second information includes the positioning measurement calculation result and/or the terminal position information.

In an embodiment of the present disclosure, the first network device is the network side device, and a downlink and uplink joint positioning is used and based on terminal positioning, the sending the first information related to the random access process, receiving the second information related to the random access process sent by the second network device, includes: after the terminal sends a preamble, message 3, message 5 or message A as the uplink positioning reference signal, sending, by the network side device, the first information carrying the positioning information, wherein the first information is message 2, message 4 or message B; the positioning information in the first information includes a first positioning measurement value; after the terminal receives message 2, message 4 or message B, obtains the first positioning measurement value, and obtains a second positioning measurement value by measuring message 2, message 4 or message B; and completes positioning calculation according to the first positioning measurement value and the second positioning measurement value, receiving, by the network side device, the second information carrying the positioning information sent by the terminal, wherein the second information is at least one of message 3, message A or message 5; the positioning information in the second information includes the positioning measurement calculation result and/or the terminal position information.

In an embodiment of the present disclosure, the first type of random access process is a four-step random access process, or a five-step random access process; the second type of random access process is a two-step random access process, or a three-step random access process.

An embodiment of the present disclosure provides a positioning method, applied to a second network device, wherein the second network device is one of a terminal and a network side device, the positioning method includes: receiving first information related to a random access process sent by a first network device, wherein the first information includes positioning information, and the first network device is one of the terminal and the network side device that is different from the second network device; wherein the positioning information includes at least one of the following information: an uplink positioning reference signal, configuration information of the uplink positioning reference signal, a downlink positioning reference signal, configuration information of the downlink positioning reference signal, a positioning measurement value, a positioning calculation result or terminal position information.

In an embodiment of the present disclosure, the positioning method further includes: performing a terminal positioning process according to the positioning information.

In an embodiment of the present disclosure, the second network device is the network side device, and for a first type of random access process, the first information is at least one of a preamble, message 3 or message 5 in the first type of random access process; for a second type of random access process, the first information is message A in the second type of random access process.

In an embodiment of the present disclosure, the second network device is the terminal, and for a first type of random access process, the first information is at least one of message 2 or message 4 in the first type of random access process; for a second type of random access process, the first information is message B in the second type of random access process.

In an embodiment of the present disclosure, the positioning method further includes: sending second information related to the random access process, wherein the second information includes at least one of the positioning information.

In an embodiment of the present disclosure, the second network device is the terminal, and for a first type of random access process, the second information is at least one of a preamble, message 3 or message 5 in the first type of random access process; for a second type of random access process, the second information is message A in the second type of random access process.

In an embodiment of the present disclosure, the second network device is the network side device, and for a first type of random access process, the second information is at least one of message 2 or message 4 in the first type of random access process; for a second type of random access process, the second information is message B in the second type of random access process.

In an embodiment of the present disclosure, the second network device is the network side device, a downlink positioning method is used and based on network positioning, the receiving the first information related to the random access process sent by the first network device and sending the second information related to the random access process, includes: receiving, by the network side device, the first information carrying the positioning information sent by the terminal after receiving the downlink positioning reference signal; wherein the first information is at least one of message 3, message A or message 5, and the positioning information in the first information includes the positioning measurement value; after an LMF completes position calculation according to the positioning measurement value, and outputs the position measurement calculation result and/or the terminal position information, sending, by the network side device, the second information carrying the position information; wherein the second information is message 2, message 4 or message B; the positioning information in the second information includes the positioning measurement calculation result and/or the terminal position information.

In an embodiment of the present disclosure, the second network device is the network side device, an uplink positioning method is used and based on network positioning, the receiving the first information related to the random access process sent by the first network device and sending the second information related to the random access process, includes: receiving, by the network side device, the first information sent by the terminal; wherein the first information is a preamble, message 3, message 5 or message A, as the uplink positioning reference signal; after the network side device measures the preamble, message 3, message 5 or message A, reports the positioning measurement value to an LMF, the LMF completes position calculation based on the positioning measurement value, and outputs the position measurement calculation result and/or the terminal position information, sending, by the network side device, the second information carrying the positioning information, wherein the second information is at least one of message 2, message 4 or message B, and the positioning information in the second information includes the positioning measurement calculation result and/or the terminal position information.

In an embodiment of the present disclosure, the second network device is the network side device, a downlink and uplink joint positioning method is used and based on network positioning, the receiving the first information related to the random access process sent by the first network device, and sending the second information related to the random access process, includes: receiving, by the network side device, the first information carrying the position information sent by the terminal; wherein the first information is at least one of message 3, message A or message 5; the position information in the first information includes a first positioning measurement value; after the network side device obtains the first positioning measurement value, obtains a second positioning measurement value through message 3, message A or message 5, and reports the first positioning measurement value and the second positioning measurement value to an LMF, the LMF completes position calculation based on the first positioning measurement value and the second positioning measurement value, and obtains the position measurement calculation result and/or the terminal position information, sending, by the network side device, the second information carrying the positioning information; wherein the second information is at least one of message 2, message 4, or message B, and the positioning information in the second information includes the positioning measurement calculation result and/or the terminal position information.

In an embodiment of the present disclosure, the second network device is the network side device, and a downlink positioning method is used and based on terminal positioning, the receiving the first information related to the random access process sent by the first network device, includes: receiving, by the network side device, the first information carrying the positioning information sent by the terminal; wherein the first information is at least one of message 3, message A, or message 5, and the positioning information includes the positioning measurement calculation result and/or the terminal position information.

In an embodiment of the present disclosure, the second network device is the network side device, and an uplink positioning method is used and based on terminal positioning, the receiving the first information related to the random access process sent by the first network device, and sending the second information related to the random access process, includes: receiving, by the network side device, a preamble, message 3, message 5 or message A sent by the terminal, wherein the preamble, message 3, message 5 or message A is used as the uplink positioning reference signal; after the network side device measures the preamble, message 3, message 5 or message A, sending, by the network side device, the second information carrying the positioning information, wherein the second information is at least one of message 2, message 4 or message B, the positioning information in the second information includes the positioning measurement value; receiving, by the network side device, the first information including the positioning information sent by the terminal, wherein the first information is message 3, message A or message 5, and the positioning information in the first information includes the positioning measurement calculation result and/or the terminal position information.

In an embodiment of the present disclosure, the second network device is the network side device, and a downlink and uplink joint positioning method is used and based on terminal positioning, the receiving the first information related to the random access information sent by the first network device, sending the second information related to the random access process, includes: receiving, by the network side device, a preamble, message 3, message 5 or message A sent by the terminal, wherein the preamble, message 3, message 5 or message A is used as the uplink positioning reference signal; sending, by the network side device, the second information carrying the positioning information, wherein the second information is message 2, message 4, or message B; the positioning information in the second information includes a first positioning measurement value; after the terminal receives message 2, message 4 or message B, obtains the first positioning measurement value, and obtains a second positioning measurement value by measuring message 2, message 4 or message B; and completes positioning calculation according to the first positioning measurement value and the second positioning measurement value, receiving, by the network side device, the first information carrying the positioning information sent by the terminal, wherein the first information is at least one of message 3, message A or message 5; the positioning information in the first information includes the positioning measurement calculation result and/or the terminal position information.

In an embodiment of the present disclosure, the second network device is the terminal, a downlink positioning method is used and based on network positioning, the receiving the first information related to the random access process sent by the first network device, and sending the second information related to the random access process, includes: after receiving the downlink positioning reference signal, sending, by the terminal, the second information including the positioning information; wherein the second information is at least one of message 3, message A, or message 5; the positioning information in the second information is the positioning measurement value; after an LMF completes position calculation according to the positioning measurement value, and outputs the position measurement calculation result and/or the terminal position information, receiving, by the terminal, the first information carrying the position information sent by the network side device; wherein the first information is message 2, message 4 or message B; the positioning information in the first information includes the positioning measurement calculation result and/or the terminal position information.

In an embodiment of the present disclosure, the second network device is the terminal, an uplink positioning method is used and based on network positioning, the receiving the first information related to random access process sent by the first network device, includes: sending, by the terminal, a preamble, message 3, message 5 or message A as the uplink positioning reference signal; after the network side device measures the preamble, message 3, message 5 or message A, reports the positioning measurement value to an LMF, the LMF completes position calculation based on the positioning measurement value, and outputs the position measurement calculation result and/or the terminal position information, receiving, by the terminal, the first information carrying the positioning information sent by the network side device, wherein the first information is at least one of message 2, message 4, or message B, the positioning information in the first information includes the positioning measurement calculation result and/or the terminal position information.

In an embodiment of the present disclosure, the second network device is the terminal, a downlink and uplink joint positioning method is used and based on network positioning, the receiving the first information related to the random access process sent by the first network device, and sending the second information related to the random access process, includes: receiving, by the terminal, the downlink positioning reference signal, and sending the second information including the positioning information; wherein the second information is at least one of message 3, message A, or message 5; the positioning information in the second information is a first positioning measurement value; after the network side device obtains the first positioning measurement value, obtains a second positioning measurement value through message 3, message A or message 5, and reports the first positioning measurement value and the second positioning measurement value to an LMF, and the LMF completes positioning calculation based on the first positioning measurement value and the second positioning measurement value, and obtains the positioning measurement calculation result and/or the terminal position information, receiving, by the terminal, the first information carrying the positioning information sent by the network side device; wherein the first information is at least one of message 2, message 4, or message B, and the positioning information in the first information includes the positioning measurement calculation result and/or the terminal position information.

In an embodiment of the present disclosure, the second network device is the terminal, and an uplink positioning method is used and based on terminal positioning, the receiving the first information related to the random access process sent by the first network device, and sending the second information related to the random access process, includes: sending, by the terminal, a preamble, message 3, message 5 or message A as the uplink positioning reference signal; after the network side device measures the preamble, message 3, message 5 or message A, receiving, by the terminal, the first information carrying the positioning information sent by the network side device, wherein the first information is at least one of message 2, message 4 or message B, the positioning information in the first information includes the positioning measurement value; sending, by the terminal, the second information including the positioning information, wherein the second information is message 3, message A or message 5, and the positioning information in the second information includes the positioning measurement calculation result and/or the terminal position information.

In an embodiment of the present disclosure, the second network device is the terminal, a downlink and uplink joint positioning is used and based on terminal positioning, the receiving the first information related to the random access process sent by the first network device, and sending the second information related to the random access process, includes: sending, by the terminal, a preamble, message 3, message 5 or message A as the uplink positioning reference signal; receiving, by the terminal, the first information carrying the positioning information sent by the network side device, wherein the first information is message 2, message 4 or message B; the positioning information in the first information includes a first positioning measurement value; after the terminal receives message 2, message 4 or message B, obtains the first positioning measurement value, and obtains a second positioning measurement value by measuring message 2, message 4 or message B; and completes positioning calculation according to the first positioning measurement value and the second positioning measurement value, sending, by the terminal, the second information carrying the positioning information, wherein the second information is at least one of message 3, message A, or message 5; the positioning information in the second information includes the positioning measurement calculation result and/or the terminal position information.

An embodiment of the present disclosure provides a network device, being a first network device, and comprising: a transceiver, a memory, a processor, and program instructions stored in the memory and executed by the processor; wherein, the transceiver receives and transmits data under the control of the processor, the program instructions in memory are read by the processor to perform the following steps: sending first information related to a random access process, wherein the first information includes positioning information; wherein the positioning information includes at least one of the following information: an uplink positioning reference signal, configuration information of the uplink positioning reference signal, a downlink positioning reference signal, configuration information of the downlink positioning reference signal, a positioning measurement value, a positioning calculation result or terminal position information.

An embodiment of the present disclosure provides a network device, being a second network device, and comprising: a transceiver, a memory, a processor, and program instructions stored in the memory and executed by the processor; wherein, the transceiver receives and transmits data under the control of the processor, the program instructions in memory are read by the processor to perform the following steps: receiving first information related to a random access process sent by a first network device, wherein the first information includes positioning information, and the first network device is one of the terminal and the network side device that is different from the second network device; wherein the positioning information includes at least one of the following information: an uplink positioning reference signal, configuration information of the uplink positioning reference signal, a downlink positioning reference signal, configuration information of the downlink positioning reference signal, a positioning measurement value, a positioning calculation result or terminal position information.

An embodiment of the present disclosure provides a positioning device, applied to a first network device, wherein the first network device is one of a terminal and a network side device, the positioning device includes: a first information transmission unit, configured to send first information related to a random access process, wherein the first information includes positioning information; wherein the positioning information includes at least one of the following information: an uplink positioning reference signal, configuration information of the uplink positioning reference signal, a downlink positioning reference signal, configuration information of the downlink positioning reference signal, a positioning measurement value, a positioning calculation result or terminal position information.

In an embodiment of the present disclosure, the first network device is the terminal, and for a first type of random access process, the first information is at least one of a preamble, message 3 or message 5 in the first type of random access process; for a second type of random access process, the first information is message A in the second type of random access process.

In an embodiment of the present disclosure, the first network device is the network side device, and for a first type of random access process, the first information is at least one of message 2 or message 4 in the first type of random access process; for a second type of random access process, the first information is message B in the second type of random access process.

In an embodiment of the present disclosure, the first information transmission unit is further configured to: receive second information related to the random access process sent by a second network device, wherein the second information includes at least one of the positioning information; the second network device is one of the terminal and the network side device that is different from the first network device.

In an embodiment of the present disclosure, the first network device is the network side device, and for a first type of random access process, the second information is at least one of a preamble, message 3, or message 5 in the first type of random access process; for a second type of random access process, the second information is message A in the second type of random access process.

In an embodiment of the present disclosure, the first network device is the terminal, and for a first type of random access process, the second information is at least one of message 2 or message 4 in the first type of random access process; for a second type of random access process, the second information is message B in the second type of random access process.

In an embodiment of the present disclosure, the first information transmission unit is further configured to: obtain first assistance data sent by a location management function unit (LMF); wherein the first assistance data includes configuration information of at least one of the preamble, message 3, message 5 or message A sent by the terminal in the random access process; and/or obtain second assistance data sent by the LMF; wherein the second assistance data includes configuration information of at least one of message 2, message 4, or message B sent by other network side devices in the random access process.

In an embodiment of the present disclosure, the first network device is the terminal, and when a downlink positioning method is used and based on network positioning, the first information transmission unit sending the first information related to the random access process, and receiving the second information related to the random access process sent by the second network device includes: after receiving the downlink positioning reference signal, sending, by the terminal, the first information carrying the positioning information; wherein the first information is at least one of message 3, message A or message 5, and the positioning information in the first information includes the positioning measurement value; after LMF completes position calculation according to the positioning measurement value, and outputs a positioning measurement calculation result and/or the terminal position information, receiving, by the terminal, the second information carrying the position information sent by the network side device; wherein the second information is message 2, message 4 or message B; the positioning information in the second information includes the positioning measurement calculation result and/or terminal position information.

In an embodiment of the present disclosure, the first network device is the terminal, an uplink positioning method is used and based on network positioning, the first information transmission unit sending the first information related to the random access process, and receiving the second information related to the random access process sent by the second network device includes: sending, by the terminal, the first information; wherein the first information is a preamble, message 3, message 5 or message A, as the uplink positioning reference signal; after the network side device measures the preamble, message 3, message 5 or message A, reports the positioning measurement value to an LMF, the LMF completes the position calculation based on the positioning measurement value, and outputs the position measurement calculation result and/or the terminal position information, receiving, by the terminal, the second information carrying the positioning information sent by the network side device, wherein the second information is at least one of message 2, message 4 or message B, the positioning information in the second information includes the positioning measurement calculation result and/or terminal position information.

In an embodiment of the present disclosure, the first network device is the terminal, a downlink and uplink joint positioning method is used, and based on network positioning, the first information transmission unit sending the first information related to the random access process, and receiving the second information related to the random access process sent by the second network device includes: after receiving the downlink positioning reference signal, sending, by the terminal, the first information carrying positioning information; wherein the first information is at least one of message 3, message A or message 5; the positioning information in the first information includes a first positioning measurement value; after the network side device obtains the first positioning measurement value, obtains a second positioning measurement value through message 3, message A or message 5, and reports the first positioning measurement value and the second positioning measurement value to a LMF, the LMF completes the positioning calculation based on the first positioning measurement value and the second positioning measurement value, and obtains the positioning measurement calculation result and/or terminal position information, receiving, by the terminal, the second information carrying the positioning information sent by the network side device; wherein the second information is at least one of message 2, message 4, or message B, and the positioning information in the second information includes the positioning measurement calculation result and/or terminal position information.

In an embodiment of the present disclosure, the first network device is the terminal, and a downlink positioning method is used and based on terminal positioning, the first information transmission unit sending the first information related to the random access process, includes: after receiving the downlink positioning reference signal, sending, by the terminal, the first information carrying the positioning information; wherein the first information is at least one of message 3, message A or message 5, and the positioning information includes the positioning measurement calculation result and/or the terminal position information.

In an embodiment of the present disclosure, the first network device is the terminal, and an uplink positioning method is used and based on terminal positioning, the first information transmission unit sending the first information related to the random access process and receiving the second information related to the random access process sent by the second network device includes: sending, by the terminal, a preamble, message 3, message 5 or message A as the uplink positioning reference signal; after the network side device measures the preamble, message 3, message 5 or message A, receiving, by the terminal, the second information carrying the positioning information sent by the network side device, wherein the second information is at least one of message 2, message 4 or message B, the positioning information in the second information includes the positioning measurement value; sending, by the terminal, the first information including the positioning information, wherein the first information is message 3, message A or message 5, and the positioning information in the first information includes the positioning measurement calculation result and/or the terminal position information.

In an embodiment of the present disclosure, the first network device is the terminal, and a downlink and uplink joint positioning is used and based on terminal positioning, the first information transmission unit sending the first information related to the random access process, and receiving the second information related to the random access process sent by the second network device includes: sending, by the terminal, a preamble, message 3, message 5 or message A as the uplink positioning reference signal; receiving, by the terminal, second information carrying the positioning information sent by the network side device, wherein the second information is message 2, message 4 or message B; the positioning information in the second information includes a first positioning measurement value; after the terminal receives message 2, message 4 or message B, obtains a first positioning measurement value, and obtains a second positioning measurement value by measuring message 2, message 4 or message B; and completes positioning calculation according to the first positioning measurement value and the second positioning measurement value, sending, by the terminal the first information carrying the positioning information, wherein the first information is at least one of message 3, message A or message 5; the positioning information in the first information includes the positioning measurement calculation result and/or the terminal position information.

In an embodiment of the present disclosure, the first network device is the network side device, a downlink positioning method is used and based on network positioning, the first information transmission unit sending the first information related to the random access process, and receiving the second information related to the random access process sent by the second network device includes: receiving, by the network side device, second information including the positioning information sent by the terminal; wherein the second information is at least one of message 3, message A, or message 5; the positioning information in the second information is the positioning measurement value; after the LMF completes position calculation according to the positioning measurement value, and outputs the position measurement calculation result and/or the terminal position information, sending, by the network side device, the first information carrying the position information; wherein the first information is message 2, message 4 or message B; the positioning information in the first information includes the positioning measurement calculation result and/or the terminal position information.

In an embodiment of the present disclosure, the first network device is the network side device, an uplink positioning method is used and based on network positioning, the first information transmission unit sending first information related to a random access process includes: after the terminal sends a preamble, message 3, message 5 or message A as the uplink positioning reference signal, measuring, by the network side device, the preamble, message 3, message 5 or message A, and reporting the positioning measurement value to a LMF, the LMF completes positioning calculation based on the positioning measurement value, and outputs the positioning measurement calculation result and/or the terminal position information, sending, by the network side device, the first information carrying the positioning information, wherein the first information is at least one of message 2, message 4, or message B, and the positioning information in the first information includes the positioning measurement calculation result and/or the terminal position information.

In an embodiment of the present disclosure, the first network device is the network side device, a downlink and uplink joint positioning method is used, and based on network positioning, the first information transmission unit sending the first information related to a random access process includes: after the terminal receives the downlink positioning reference signal and sends at least one of message 3, message A, or message 5 including a first positioning measurement value, obtaining, by the network side device, the first positioning measurement value, and obtaining a second positioning measurement value through message 3, message A or message 5, reporting the first positioning measurement value and the second positioning measurement value to LMF, the LMF completes positioning calculation based on the first positioning measurement value and the second positioning measurement value, and obtains the positioning measurement calculation result and/or the terminal position information, sending, by the network side device, the first information carrying the positioning information; wherein the first information is at least one of message 2, message 4 or message B, the positioning information in the first information includes the positioning measurement calculation result and/or the terminal position information.

In an embodiment of the present disclosure, the first network device is the network side device, and an uplink positioning method is used and based on terminal positioning, the first information transmission unit sending the first information related to the random access process, and receiving the second information related to the random access process sent by the second network device includes: after the terminal sends a preamble, message 3, message 5 or message A as the uplink positioning reference signal, and the network side device measures the preamble, message 3, message 5 or message A, sending, by the network side device, the first information carrying the positioning information, wherein the first information is at least one of message 2, message 4, or message B, and the positioning information in the first information includes the positioning measurement value; receiving, by the network side device, second information including the positioning information sent by the terminal, wherein the second information is message 3, message A or message 5, and the positioning information in the second information includes the positioning measurement calculation result and/or the terminal position information.

In an embodiment of the present disclosure, the first network device is the network side device, and a downlink and uplink joint positioning is used and based on terminal positioning, the first information transmission unit sending the first information related to the random access process, receiving the second information related to the random access process sent by the second network device, includes: after the terminal sends a preamble, message 3, message 5 or message A as the uplink positioning reference signal, sending, by the network side device, the first information carrying the positioning information, wherein the first information is message 2, message 4 or message B; the positioning information in the first information includes a first positioning measurement value; after the terminal receives message 2, message 4 or message B, obtains the first positioning measurement value, and obtains a second positioning measurement value by measuring message 2, message 4 or message B; and completes positioning calculation according to the first positioning measurement value and the second positioning measurement value, receiving, by the network side device, the second information carrying the positioning information sent by the terminal, wherein the second information is at least one of message 3, message A or message 5; the positioning information in the second information includes the positioning measurement calculation result and/or the terminal position information.

An embodiment of the present disclosure provides a positioning device, applied to a second network device, wherein the second network device is one of a terminal and a network side device, the positioning device includes: a second information transmission unit, configured to receive first information related to a random access process sent by a first network device, wherein the first information includes positioning information, and the first network device is one of the terminal and the network side device that is different from the second network device; wherein the positioning information includes at least one of the following information: an uplink positioning reference signal, configuration information of the uplink positioning reference signal, a downlink positioning reference signal, configuration information of the downlink positioning reference signal, a positioning measurement value, a positioning calculation result or terminal position information.

In an embodiment of the present disclosure, the second information transmission unit is further configured to: perform a terminal positioning process according to the positioning information.

In an embodiment of the present disclosure, the second network device is the network side device, and for a first type of random access process, the first information is at least one of a preamble, message 3 or message 5 in the first type of random access process; for a second type of random access process, the first information is message A in the second type of random access process.

In an embodiment of the present disclosure, the second network device is the terminal, and for a first type of random access process, the first information is at least one of message 2 or message 4 in the first type of random access process; for a second type of random access process, the first information is message B in the second type of random access process.

In an embodiment of the present disclosure, the second information transmission unit is further configured to: send second information related to the random access process, wherein the second information includes at least one of the positioning information.

In an embodiment of the present disclosure, the second network device is the terminal, and for a first type of random access process, the second information is at least one of a preamble, message 3 or message 5 in the first type of random access process; for a second type of random access process, the second information is message A in the second type of random access process.

In an embodiment of the present disclosure, the second network device is the network side device, and for a first type of random access process, the second information is at least one of message 2 or message 4 in the first type of random access process; for a second type of random access process, the second information is message B in the second type of random access process.

In an embodiment of the present disclosure, the second network device is the network side device, a downlink positioning method is used and based on network positioning, the second information transmission unit receiving the first information related to the random access process sent by the first network device and sending the second information related to the random access process, includes: receiving, by the network side device, the first information carrying the positioning information sent by the terminal after receiving the downlink positioning reference signal; wherein the first information is at least one of message 3, message A or message 5, and the positioning information in the first information includes the positioning measurement value; after an LMF completes position calculation according to the positioning measurement value, and outputs the position measurement calculation result and/or the terminal position information, sending, by the network side device, the second information carrying the position information; wherein the second information is message 2, message 4 or message B; the positioning information in the second information includes the positioning measurement calculation result and/or the terminal position information.

In an embodiment of the present disclosure, the second network device is the network side device, an uplink positioning method is used and based on network positioning, the second information transmission unit receiving the first information related to the random access process sent by the first network device and sending the second information related to the random access process, includes: receiving, by the network side device, the first information sent by the terminal; wherein the first information is a preamble, message 3, message 5 or message A, as the uplink positioning reference signal; after the network side device measures the preamble, message 3, message 5 or message A, reports the positioning measurement value to an LMF, the LMF completes position calculation based on the positioning measurement value, and outputs the position measurement calculation result and/or the terminal position information, sending, by the network side device, the second information carrying the positioning information, wherein the second information is at least one of message 2, message 4 or message B, and the positioning information in the second information includes the positioning measurement calculation result and/or the terminal position information.

In an embodiment of the present disclosure, the second network device is the network side device, a downlink and uplink joint positioning method is used and based on network positioning, the second information transmission unit receiving the first information related to the random access process sent by the first network device, and sending the second information related to the random access process, includes: receiving, by the network side device, the first information carrying the position information sent by the terminal; wherein the first information is at least one of message 3, message A or message 5; the position information in the first information includes a first positioning measurement value; after the network side device obtains the first positioning measurement value, obtains a second positioning measurement value through message 3, message A or message 5, and reports the first positioning measurement value and the second positioning measurement value to an LMF, the LMF completes position calculation based on the first positioning measurement value and the second positioning measurement value, and obtains the position measurement calculation result and/or the terminal position information, sending, by the network side device, the second information carrying the positioning information; wherein the second information is at least one of message 2, message 4, or message B, and the positioning information in the second information includes the positioning measurement calculation result and/or the terminal position information.

In an embodiment of the present disclosure, the second network device is the network side device, and a downlink positioning method is used and based on terminal positioning, the second information transmission unit receiving the first information related to the random access process sent by the first network device, includes: receiving, by the network side device, the first information carrying the positioning information sent by the terminal; wherein the first information is at least one of message 3, message A, or message 5, and the positioning information includes the positioning measurement calculation result and/or the terminal position information.

In an embodiment of the present disclosure, the second network device is the network side device, and an uplink positioning method is used and based on terminal positioning, the second information transmission unit receiving the first information related to the random access process sent by the first network device, and sending the second information related to the random access process, includes: receiving, by the network side device, a preamble, message 3, message 5 or message A sent by the terminal, wherein the preamble, message 3, message 5 or message A is used as the uplink positioning reference signal; after the network side device measures the preamble, message 3, message 5 or message A, sending, by the network side device, the second information carrying the positioning information, wherein the second information is at least one of message 2, message 4 or message B, the positioning information in the second information includes the positioning measurement value; receiving, by the network side device, the first information including the positioning information sent by the terminal, wherein the first information is message 3, message A or message 5, and the positioning information in the first information includes the positioning measurement calculation result and/or the terminal position information.

In an embodiment of the present disclosure, the second network device is the network side device, and a downlink and uplink joint positioning method is used and based on terminal positioning, the second information transmission unit receiving the first information related to the random access information sent by the first network device, sending the second information related to the random access process, includes: receiving, by the network side device, a preamble, message 3, message 5 or message A sent by the terminal, wherein the preamble, message 3, message 5 or message A is used as the uplink positioning reference signal; sending, by the network side device, the second information carrying the positioning information, wherein the second information is message 2, message 4, or message B; the positioning information in the second information includes a first positioning measurement value; after the terminal receives message 2, message 4 or message B, obtains the first positioning measurement value, and obtains a second positioning measurement value by measuring message 2, message 4 or message B; and completes positioning calculation according to the first positioning measurement value and the second positioning measurement value, receiving, by the network side device, the first information carrying the positioning information sent by the terminal, wherein the first information is at least one of message 3, message A or message 5; the positioning information in the first information includes the positioning measurement calculation result and/or the terminal position information.

In an embodiment of the present disclosure, the second network device is the terminal, a downlink positioning method is used and based on network positioning, the second information transmission unit receiving the first information related to the random access process sent by the first network device, and sending the second information related to the random access process, includes: after receiving the downlink positioning reference signal, sending, by the terminal, the second information including the positioning information; wherein the second information is at least one of message 3, message A, or message 5; the positioning information in the second information is the positioning measurement value; after an LMF completes position calculation according to the positioning measurement value, and outputs the position measurement calculation result and/or the terminal position information, receiving, by the terminal, the first information carrying the position information sent by the network side device; wherein the first information is message 2, message 4 or message B; the positioning information in the first information includes the positioning measurement calculation result and/or the terminal position information.

In an embodiment of the present disclosure, the second network device is the terminal, an uplink positioning method is used and based on network positioning, the second information transmission unit receiving the first information related to random access process sent by the first network device, includes: sending, by the terminal, a preamble, message 3, message 5 or message A as the uplink positioning reference signal; after the network side device measures the preamble, message 3, message 5 or message A, reports the positioning measurement value to an LMF, the LMF completes position calculation based on the positioning measurement value, and outputs the position measurement calculation result and/or the terminal position information, receiving, by the terminal, the first information carrying the positioning information sent by the network side device, wherein the first information is at least one of message 2, message 4, or message B, the positioning information in the first information includes the positioning measurement calculation result and/or the terminal position information.

In an embodiment of the present disclosure, the second network device is the terminal, a downlink and uplink joint positioning method is used and based on network positioning, the second information transmission unit receiving the first information related to the random access process sent by the first network device, and sending the second information related to the random access process, includes: receiving, by the terminal, the downlink positioning reference signal, and sending the second information including the positioning information; wherein the second information is at least one of message 3, message A, or message 5; the positioning information in the second information is a first positioning measurement value; after the network side device obtains the first positioning measurement value, obtains a second positioning measurement value through message 3, message A or message 5, and reports the first positioning measurement value and the second positioning measurement value to an LMF, and the LMF completes positioning calculation based on the first positioning measurement value and the second positioning measurement value, and obtains the positioning measurement calculation result and/or the terminal position information, receiving, by the terminal, the first information carrying the positioning information sent by the network side device; wherein the first information is at least one of message 2, message 4, or message B, and the positioning information in the first information includes the positioning measurement calculation result and/or the terminal position information.

In an embodiment of the present disclosure, the second network device is the terminal, and an uplink positioning method is used and based on terminal positioning, the second information transmission unit receiving the first information related to the random access process sent by the first network device, and sending the second information related to the random access process, includes: sending, by the terminal, a preamble, message 3, message 5 or message A as the uplink positioning reference signal; after the network side device measures the preamble, message 3, message 5 or message A, receiving, by the terminal, the first information carrying the positioning information sent by the network side device, wherein the first information is at least one of message 2, message 4 or message B, the positioning information in the first information includes the positioning measurement value; sending, by the terminal, the second information including the positioning information, wherein the second information is message 3, message A or message 5, and the positioning information in the second information includes the positioning measurement calculation result and/or the terminal position information.

In an embodiment of the present disclosure, the second network device is the terminal, a downlink and uplink joint positioning is used and based on terminal positioning, the second information transmission unit receiving the first information related to the random access process sent by the first network device, and sending the second information related to the random access process, includes: sending, by the terminal, a preamble, message 3, message 5 or message A as the uplink positioning reference signal; receiving, by the terminal, the first information carrying the positioning information sent by the network side device, wherein the first information is message 2, message 4 or message B; the positioning information in the first information includes a first positioning measurement value; after the terminal receives message 2, message 4 or message B, obtains the first positioning measurement value, and obtains a second positioning measurement value by measuring message 2, message 4 or message B; and completes positioning calculation according to the first positioning measurement value and the second positioning measurement value, sending, by the terminal, the second information carrying the positioning information, wherein the second information is at least one of message 3, message A, or message 5; the positioning information in the second information includes the positioning measurement calculation result and/or the terminal position information.

An embodiment of the present disclosure provides a computer-readable storage medium, storing a computer program, wherein the computer program is executed by the computer to implement the positioning method.

The technical solution of the present disclosure has the advantages as follows.

When the terminal and/or the network side device sends the first information related to the random access process, by carrying the positioning information, the terminal in the RRC idle state or the RRC inactive state can perform the positioning process according to the random access process, so as to avoid the problems of having to enter the RRC connection state first, resulting in increased power consumption and increased positioning delay.

BRIEF DESCRIPTION OF THE DRAWINGS

FIG. 1 is a schematic flowchart of a positioning method according to an embodiment of the present disclosure;

FIG. 2 is a schematic diagram of the system architecture of a common positioning method;

FIG. 8 is a sixth schematic diagram of the system architecture using the positioning method described in the embodiment of the present disclosure;

FIG. 9 is another schematic flowchart of a positioning method according to an embodiment of the present disclosure;

DETAILED DESCRIPTION

Figure 3:
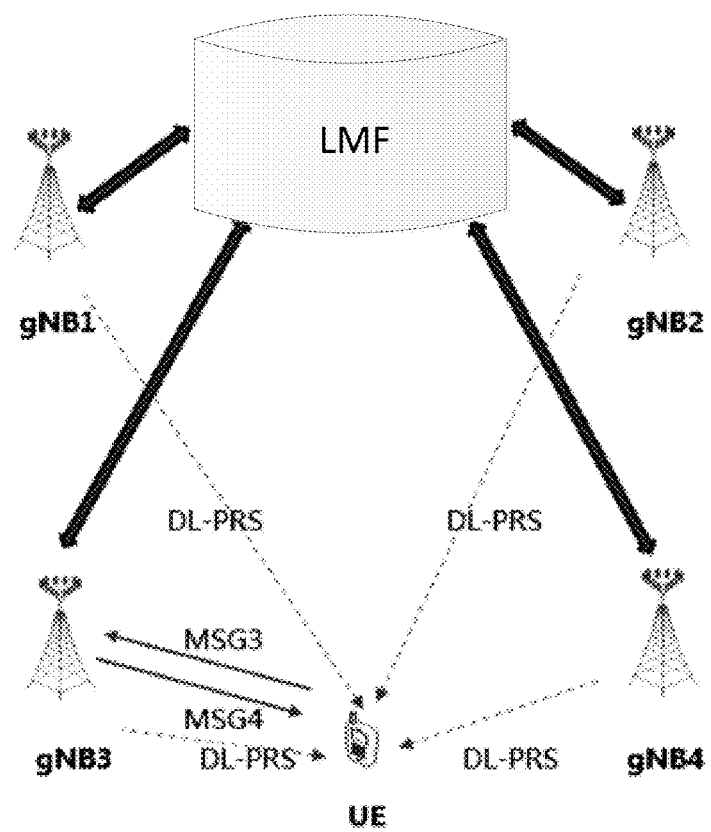
FIG. 3 is a first schematic diagram of the system architecture using the positioning method described in the embodiment of the present disclosure.

The term "and/or" in the embodiments of the present disclosure describes the association relationship of associated objects, indicating that there may be three relationships, for example, A and/or B, which may mean: A exists alone, A and B exist simultaneously, and B exists alone. The character "/" generally indicates that the objects on both sides are an "or" relationship.

The term "a plurality of" in the embodiments of the present application refers to two or more, and other quantifiers are similar.

The technical solutions in the embodiments of the present application will be clearly and completely described below in conjunction with the accompanying drawings in the embodiments of the present application. Obviously, the described embodiments are only some of the embodiments of the present application, not all of them. Based on the embodiments in the present disclosure, all other embodiments obtained by persons of ordinary skill in the art without making creative efforts belong to the scope of protection of this application.

The technical solution provided by the embodiment of the present application may be applicable to various systems, especially a fifth generation (5th Generation, 5G) system. For example, the applicable system may be global system of mobile communication (GSM), code division multiple access (CDMA) system, wideband code division multiple access (WCDMA) general packet radio service (GPRS) system, long term evolution (LTE) system, LTE frequency division duplex (FDD) system, LTE time division duplex (TDD) system, Long term evolution advanced (LTE-A) system, universal mobile telecommunication system (UMTS), worldwide interoperability for microwave access (WiMAX) system, 5G new radio (NR) system, etc. These various systems include terminal devices and network devices. The system may also include a core network, such as an evolved packet system (EPS), a 5G system (5GS), and the like.

The terminal involved in this embodiment of the present application may be a device that provides voice and/or data connectivity to users, a handheld device with a wireless connection function, or other processing devices connected to a wireless modem. In different systems, the names of terminals may be different. For example, in a 5G system, a terminal device may be called a user equipment (UE). The wireless terminal can communicate with one or more core networks (CN) via a radio access network (RAN), and wireless terminal can be mobile terminal, such as mobile phones (or called "cellular" telephones) and computers with mobile terminal, such as portable, pocket, hand-held, computer built-in or vehicle-mounted mobile devices, which exchange language and/or data with the radio access network. For example, Personal Communication Service (PCS) phones, cordless phones, Session Initiated Protocol (SIP) phones, Wireless Local Loop (WLL) stations, Personal Digital Assistant (PDA) and other devices. Wireless terminal can also be called system, subscriber unit, subscriber station, mobile station, remote station, access point, a remote terminal, an access terminal, a user terminal, a user agent, and a user device, which are not limited in this embodiment of the present application.

The network side device involved in the embodiment of the present application may include a base station, or may include a plurality of cells that provide services for the terminal. Depending on the specific application, the base station can also be called an access point, or it can be a device in the access network that communicates with the wireless terminal device through one or more sectors on the air interface, or other names.

The embodiment of the present disclosure provides a positioning method and device, which can enable a UE in an RRC idle state or an RRC inactive state to perform positioning through a random access process, so as to solve the problem in the related art that if UEs in an RRC idle state or an RRC inactive state needs to perform positioning, it must first enter the RRC connection state, resulting in increased power consumption and increased positioning delay.

Among them, the method and the device are based on the same concept. Since the principle of solving problems of the method and the device is similar, the implementation of the device and the method can be referred to each other, and the repetition will not be repeated.

In order to make the technical problems, technical solutions and advantages to be solved by the present disclosure clearer, the following will describe in detail with reference to the drawings and specific embodiments.

As shown in FIG. 1, an embodiment of the present disclosure provides a positioning method, which is applied to a first network device, and the first network device is one of a terminal and a network side device, wherein the positioning method includes:

S110. Sending first information related to a random access process, wherein the first information includes positioning information;

The positioning information includes at least one of the following information:

an uplink positioning reference signal, configuration information of the uplink positioning reference signal, a downlink positioning reference signal, configuration information of the downlink positioning reference signal, a positioning measurement value, a positioning calculation result or terminal position information.

When the terminal and/or the network side device sends the first information related to the random access process using the positioning method described in this embodiment, by carrying the positioning information, the terminal in the RRC idle state or the RRC inactive state can perform positioning based on the random access process, thereby avoiding the problem of having to enter the RRC connection state first, resulting in increased power consumption and increased positioning delay.

In order to clearly illustrate the difference between the positioning method described in the embodiment of the present disclosure and the positioning method of the related art, the positioning method of the related art will be described below with reference to FIG. 2.

The technical solutions for downlink positioning mainly include the delay-based DL-TDOA positioning method and the angle-based DL-AoD positioning method. For the delay-based DL-TDOA positioning method, the position of the terminal is estimated based on the relative time delay between base stations according to the difference in the propagation distance of the terminal relative to each base station. As shown in FIG. 2, the delay-based DL-TDOA positioning method includes the following steps:

gNB1, gNB2, gNB3 and gNB4 respectively send periodic downlink positioning reference signal (DL-PRS) to UE;

According to the DL-TDOA assistance data provided by the Position Management Function (LMF), the UE knows the configuration information of the downlink positioning reference signal (DL-PRS) sent by the gNBs around the UE, and the UE receives the DL-PRS of each gNB, first estimates Time Of Arrival (TOA) measurement value with each gNB, and then calculate the reference signal time difference (RSTD) of the downlink positioning reference signal (DL-PRS);

The DL-PRS RSTD obtained by the UE and other known information (such as the geographical coordinates of the gNB) can be used to calculate the position of the UE using a network-based positioning method or a UE-based positioning method:

If the network-based positioning method is adopted, the UE reports the obtained DL-PRS RSTD measurement value to the LMF, and the LMF uses the reported measurement value and other known information (such as the geographical coordinates of the gNB) to calculate the position of the UE;

If the UE-based positioning method is adopted, the UE uses the obtained DL-PRS RSTD and other information provided by the network (such as the geographical coordinates of the gNB) to calculate the position of the UE itself.

For the angle-based DL-AoD positioning method, the position of the terminal is determined through a plurality of angle parameters according to the position direction of the terminal relative to the base station, which specifically includes the following steps:

gNB1, gNB2, gNB3 and gNB4 respectively send periodic DL-PRS signals to UE;

The UE measures the DL-PRS beam signals of each gNB according to the configuration information of DL-PRS sent by the surrounding gNBs provided by the LMF, and reports the DL-PRS RSRP measurement value to the LMF;

The LMF uses the DL-PRS RSRP reported by the UE and other known information (such as the transmission direction of each DL-PRS beam of each gNB) to determine the angle of the UE relative to each gNB, that is, DL-AoD;

The LMF uses the obtained DL-AoD and the geographic coordinates of each gNB to calculate the position of the UE.

The above delay-based DL-TDOA positioning method and angle-based DL-AoD positioning method both require the terminal to be in the RRC connection state to perform the corresponding positioning process. Usually, when the UE is in the RRC idle state or RRC inactive state, it must enter the RRC connection state first, and perform the positioning process, which will increase additional power consumption and increase the positioning delay.

In order to solve the above-mentioned technical problems, the embodiments of the present disclosure provide a positioning method. When the terminal and/or the network side device sends the first information related to the random access process, by carrying the positioning information, the terminal in the RRC idle state or the RRC inactive state can perform the positioning process according to the random access process, so as to avoid the problems of having to enter the RRC connection state first, resulting in increased power consumption and increased positioning delay.

It should be noted that, in the embodiment of the present disclosure, the network side device may be at least one of a base station, an LMF, or a transmission reception point (TRP).

The specific implementation when the positioning method described in the embodiments of the present disclosure are respectively applied to the network side device and the terminal will be described in detail below.

In one implementation, as shown in FIG. 1, the first network device to which the positioning method is applied is a terminal.

In this embodiment, the first network device is a terminal, that is, when the positioning method described in the embodiment of the present disclosure is executed on the terminal side, for the first type of random access process, in step S110, the first information is at least one of a preamble, message 3 or message 5 of the first type of random access process; for the second type of random access process, the first information is message A in the second type of random access process.

Optionally, the first type of random access process is a four-step random access process; the second type of random access process is a two-step random access process.

Optionally, the positioning method also includes:
receiving second information related to the random access process sent by a second network device, wherein the second information includes positioning information; the second network device is one of a terminal and a network side device that is different from the first network device.

Wherein, it can be understood that when the first network device is the terminal, the second network device is the network side device; when the first network device is the network side device, the second network device is the terminal.

Based on this embodiment, both the terminal and the network side device send positioning information during the random access process, so that the terminal and the network side device perform the terminal positioning process according to the received positioning information.

In one implementation of the embodiments of the present disclosure, the first network device is a terminal, the second network device is a network side device, and for the first type of random access process, the second information is at least one of message 2 and message 4 in the first type of random access process; for the second type of random access process, the second information is message B in the second type of random access process.

According to the above, optionally, the first type of random access process is a four-step random access process, or a five-step random access process; the second type of random access process is a two-step random access process, or a three-step random access process.

In one implementation of the embodiments of the present disclosure, when the first network device is a terminal, the positioning information carried in the first information includes at least one of the uplink positioning reference signal, the configuration information of the uplink positioning reference signal, the positioning measurement value, the positioning calculation result or the terminal position information;

The positioning information carried in the second information includes at least one of a downlink positioning reference signal, configuration information of the downlink positioning reference signal, a positioning measurement value, a positioning calculation result, and terminal position information.

Specifically, according to different positioning solutions, the positioning information carried in the first information and the positioning information carried in the second information respectively include different information contents.

Optionally, the positioning method further includes: obtaining first assistance data sent by the position management function unit LMF; the first assistance data includes configuration information of at least one of the preamble, message 3, message 5 and message A sent by the terminal during the random access process; and/or Obtaining second assistance data sent by the LMF; the second assistance data includes configuration information of at least one of message 2, message 4, and message B sent by other network side devices during the random access process.

By obtaining the first auxiliary data and/or second auxiliary data, the terminal and/or the network side device can use the first auxiliary data and/or the second auxiliary data to perform positioning during terminal positioning according to the positioning information.

In the positioning method described in the embodiments of the present disclosure, when the first network device is a terminal and the second network device is a network side device, implementation 1 is as follows.

When the downlink positioning method is adopted and based on the network positioning method, sending the first information related to the random access process is sent, and receiving the second information related to the random access process sent by the second network device, including:

After receiving the downlink positioning reference signal, the terminal sends first information carrying positioning information; the first information is at least one of message 3, message A and message 5, and the positioning information in the first information includes the positioning measurement result;

After the position management function unit LMF completes the position calculation according to the positioning measurement value, and outputs the position measurement calculation result and/or the terminal position information, the terminal receives the second information carrying the position information sent by the network side device; the second information is message 2, message 4 or message B; the positioning information in the second information includes a positioning measurement calculation result and/or terminal position information.

Specifically, when the downlink positioning method is adopted and based on the network (Network-based), sending the positioning information during the random access process to complete the positioning process, including:

The terminal receives the downlink positioning reference signal, and at least one of message 3, message A or message 5 sent by the terminal carries a positioning measurement value;

The LMF completes the positioning calculation based on the positioning measurement value, and outputs the positioning calculation result or UE position information;

The message 2, message 4 or message B sent by the base station or the TRP carries the positioning calculation result or UE position information.

Implementation 2:

When using the uplink positioning method and based on network positioning, sending the first information related to the random access process, and receiving the second information related to the random access process sent by the second network device, including:

The terminal sends the first information; the first information is a preamble, message 3, message 5 or message A, as an uplink positioning reference signal;

After the network side device measures the preamble, message 3, message 5 or message A, reports the positioning measurement value to the position management function unit LMF, and the LMF completes the position calculation based on the positioning measurement value, and outputs the position measurement calculation result and/or the terminal position information, the terminal receives second information carrying positioning information sent by the network side device, and the second information is at least one of message 2, message 4 and message B, the positioning information in the second information includes a positioning measurement calculation result and/or terminal position information.

Specifically, when using the uplink positioning method and based on the network positioning method, the positioning information is sent during the random access process to complete the positioning process, including:

The terminal sends the preamble, message 3, message 5 or message A as an uplink positioning reference signal;

The base station or TRP measures the preamble, message 3, message 5 or message A, and reports the positioning measurement value to the LMF, and the LMF completes the positioning calculation based on the positioning measurement value, and outputs the positioning calculation result or UE position information;

The base station or TRP sends at least one information in message 2, message 4 and message B, which carries the positioning calculation result or UE position information Implementation 3:

When the downlink and uplink joint positioning method is adopted and network-based positioning is used, sending the first information related to the random access process, and receiving the second information related to the random access process sent by the second network device, including at least one of the following steps:

After receiving the downlink positioning reference signal, the terminal sends first information carrying positioning information; the first information is at least one of message 3, message A and message 5; the positioning information in the first information includes the first positioning measurement value;

After the network side device obtains the first positioning measurement value, obtains the second positioning measurement value through message 3, message A or message 5, and reports the first positioning measurement value and the second positioning measurement value to the positioning management function unit LMF, the LMF completes the positioning calculation based on the first positioning measurement value and the second positioning measurement value, and obtains the positioning measurement calculation result and/or terminal position information, the terminal receives the second information carrying positioning information sent by the network side device; the second information is at least one of message 2, message 4, and message B, and the positioning information in the second information includes the positioning measurement calculation result and/or terminal position information.

Specifically, when using the downlink and uplink joint positioning method and based on the network positioning method, the positioning information is sent during the random access process to complete the positioning process, including:

The UE receives the downlink positioning reference signal; and the message 3 or message A sent by the UE carries the first positioning measurement value;

The base station or TRP obtains the first positioning measurement value from the information carried in message 3, message A or message 5 sent by the UE; and the base station or TRP obtains the second positioning measurement value by measuring message 3, message A or message 5; reports the first positioning measurement value and the second positioning measurement value to the LMF, and the LMF completes the positioning calculation based on the positioning measurement values, and outputs the positioning calculation result or UE position information;

The base station or TRP sends at least one of message 2, message 4 and message B, which carries the positioning calculation result or UE position information;

Implementation 4:

When the downlink positioning method is adopted and terminal-based (UE-based) positioning is used, sending the first information related to the random access process, including:

After the terminal receives the downlink positioning reference signal, the terminal sends the first information carrying positioning information; the first information is at least one of message 3, message A and message 5, and the positioning information includes the positioning measurement calculation result and/or the terminal position information.

Specifically, when the downlink positioning method is adopted and UE-based positioning is used, sending the positioning information during the random access process to complete the positioning process, including:

The terminal receives the downlink positioning reference signal, and at least one of message 3, message A and message 5 sent by the terminal carries a positioning calculation result or UE position information.

Implementation 5:

When the uplink positioning method is adopted and based on terminal positioning, the first information related to the random access process is sent, receiving the second information related to the random access process sent by the second network device, including:

The terminal sends a preamble, message 3, message 5 or message A as an uplink positioning reference signal;

After the network side device measures the preamble, message 3, message 5 or message A, the terminal receives the second information carrying positioning information sent by the network side device, the second information is at least one of message 2, message 4 and message B, the positioning information in the second information includes a positioning measurement value;

The terminal sends the first information including positioning information, the first information is message 3, message A or message 5, and the positioning information in the first information includes positioning measurement calculation result and/or terminal position information.

Specifically, when the uplink positioning method is used and based on terminal positioning, sending the positioning information during the random access process to complete the positioning process, including:

The terminal sends the preamble, message 3, message 5 or message A as an uplink positioning reference signal;

The base station or the TRP measures the preamble, message 3, message 5, or message A, and sends at least one information in message 2, message 4, and message B, which carries the positioning measurement value or a positioning measurement processing value;

The message 3, message A or message 5 sent by the terminal carries the positioning calculation result or UE position information.

Implementation 6:

When downlink and uplink joint positioning is adopted and based on terminal positioning, sending the first information related to the random access process, and receiving the second information related to the random access process sent by the second network device, including:

The terminal sends a preamble, message 3, message 5 or message A as an uplink positioning reference signal;

The terminal receives second information carrying positioning information sent by the network side device, the second information is message 2, message 4 or message B; the positioning information in the second information includes a first positioning measurement value;

After the terminal receives the message 2, message 4 or message B, obtains the first positioning measurement value, and obtains a second positioning measurement value by measuring the message 2, message 4 or message B; and completes the positioning calculation according to the first positioning measurement value and the second positioning measurement value, the terminal sends first information carrying positioning information, the first information is at least one of message 3, message A and message 5; wherein, the positioning information in the first information includes positioning measurement calculation result and/or terminal position information.

Specifically, when the downlink and uplink joint positioning method is adopted, and based on terminal positioning, sending the positioning information during the random access process to complete the positioning process, including:

The terminal sends the preamble, message 3, message 5 or message A as an uplink positioning reference signal;

The base station or the TRP receives the uplink positioning reference signal; and the message 2, message 4 or message B sent by the base station or the TRP carries the first positioning measurement value;

The terminal obtains the first positioning measurement value from the information carried in the message 2, message 4 or message B sent by the base station or the TRP; and the UE obtains the second positioning measurement value by measuring the message 2, message 4 or message B; the UE completes the positioning calculation according to the first positioning measurement value and the second positioning measurement value, and outputs the positioning calculation result or UE position information;

The UE sends at least one information in message 3, message A and message 5, which carries a positioning calculation result or UE position information.

In another embodiment of the present disclosure, when the first network device is a network side device and the second network device is a terminal, the specific implementation of the positioning method in the embodiment of the present disclosure includes:

Implementation 7:

When the downlink positioning method is adopted and based on the network positioning method, sending the first information related to the random access process, and receiving the second information related to the random access process sent by the second network device, including:

The network side device receives second information including positioning information sent by the terminal; the second information is at least one of message 3, message A, and message 5; the positioning information in the second information is a positioning measurement value;

After the LMF completes the position calculation according to the positioning measurement value, and outputs the position measurement calculation result and/or the terminal position information, the network side device sends the first information carrying the position information; the first information is message 2, message 4 or message B; the positioning information in the first information includes positioning measurement calculation result and/or terminal position information.

Implementation 8:

When the uplink positioning method is used and based on network positioning, sending the first information related to the random access process, including:

after the terminal sends the preamble, message 3, message 5 or message A as the uplink positioning reference signal, the network side device measures the preamble, message 3, message 5 or message A, and reports the positioning measurement value to the LMF, the LMF completes the positioning calculation based on the positioning measurement value, and outputs the positioning measurement calculation result and/or the terminal position information, sending, by the network side device, the first information carrying the positioning information, wherein the first information is at least one of message 2, message 4, and message B, and the positioning information in the first information includes a positioning measurement calculation result and/or terminal position information.

Implementation 9:

When the downlink and uplink joint positioning method is adopted, and based on the network positioning, sending the first information related to the random access process includes at least one of the following steps:

After the terminal receives the downlink positioning reference signal and sends at least one of message 3, message A, and message 5 including the first positioning measurement value, the network side device obtains the first positioning measurement value, and obtains the second positioning measurement value through message 3, message A or message 5, reports the first positioning measurement value and the second positioning measurement value to the position management function unit LMF, the LMF completes the positioning calculation based on the first positioning measurement value and the second positioning measurement value, and obtains the positioning measurement calculation result and/or the terminal position information, the network side device sends the first information carrying the positioning information; the first information is at least one of message 2, message 4 and message B, the positioning information in the first information includes positioning measurement calculation result and/or terminal position information.

Implementation 10:

When the uplink positioning method is adopted and based on terminal positioning, sending the first information related to the random access process, and the receiving the second information related to the random access process sent by the second network device, including:

After the terminal sends the preamble, message 3, message 5 or message A as the uplink positioning reference signal, and the network side device measures the preamble, message 3, message 5 or message A, the network side device sends the first information carrying the positioning information, the first information is at least one of message 2, message 4, and message B, and the positioning information in the first information includes a positioning measurement value;

The network side device receives the second information including positioning information sent by the terminal, the second information is message 3, message A or message 5, and the positioning information in the second information includes positioning measurement calculation result and/or terminal position information.

Implementation 11:

When downlink and uplink joint positioning is adopted and based on terminal positioning, sending the first information related to the random access process, and receiving the second information related to the random access process sent by the second network device, including:

After the terminal sends the preamble, message 3, message 5 or message A as the uplink positioning reference signal, the network side device sends the first information carrying positioning information, and the first information is message 2, message 4 or message B; the positioning information in the first information includes a first positioning measurement value;

After the terminal receives the message 2, message 4 or message B, obtains the first positioning measurement value, and obtains a second positioning measurement value by measuring the message 2, message 4 or message B; and completes the positioning calculation according to the first positioning measurement value and the second positioning measurement value, the network side device receives the second information carrying positioning information sent by the terminal, and the second information is at least one of message 3, message A and message 5; wherein, the positioning information in the second information includes positioning measurement calculation result and/or terminal position information.

It should be noted that, in the embodiment of the present disclosure, when the positioning information in the first information sent by the terminal includes the positioning measurement value (the first positioning measurement value or the second positioning measurement value), the positioning measurement value is measured value of the base station sending and receiving time difference.

When the positioning information in the second information sent by the network side device that is received by the terminal includes the positioning measurement value (the first positioning measurement value or the second positioning measurement value), the positioning measurement value is measured value of the terminal sending and receiving time difference.

Further, it should be noted that the positioning measurement value may include a positioning measurement initial value and a positioning measurement processing value, wherein the positioning measurement initial value includes at least one information in time of arrival (ToA), time difference of arrival (TDoA), arrival Angle of Arrival (AoA), Phase of Arrival (POA), Reference Signal Time Difference (STD), Relative Time Of Arrival (RTOA), time difference of the receiving and sending of the terminal and time difference of the receiving and sending by the base station; the positioning measurement processing value includes a value of at least one information after data processing in ToA, TDoA, AoA, POA, RSTD, RTOA, terminal receiving and sending time difference and base station receiving and sending time difference.

Optionally, in the embodiment of the present disclosure, the downlink positioning method includes at least one of a downlink-time difference of arrival (DL-TDOA) positioning method, an observed time difference of arrival (OTDOA) positioning method or a Downlink-Angle of Departure (DL-AoD) positioning method.

Optionally, the uplink positioning method includes at least one of an uplink-time difference of arrival (UL-TDOA) positioning method, an uplink time difference of arrival (UTDOA) positioning method and an uplink angle of arrival (UL-AoA) positioning method.

Optionally, the downlink and uplink joint positioning method includes: at least one of: round trip time (RTT), multiple round trip times (Multi-RTT), enhanced cell identification (E-CID).

In the positioning method described in the embodiments of the present disclosure, at least one information in the preamble, message 3, message A and message 5 sent by the terminal during the random access process carries the first positioning information, and/or, at least one information in message 2, message 4 and message B sent by the base station or the TRP during the random access process carries the second positioning information, and the terminal, base station or TRP and LMF complete the positioning process according to the positioning information.

For the four-step random access process, the first positioning information sent by the terminal is carried by at least one of preamble and MSG3; the second positioning information sent by the base station or TRP is carried by at least one of MSG2 and MSG4;

For the two-step random access process, the first positioning information sent by the terminal is carried by MSGA; the second positioning information sent by the base station or TRP is carried by MSGB.

Using the positioning method described in the embodiments of the present disclosure, the positioning information is carried by at least one of the preamble, MSG2, MSG3, MSG4, MSG5, MSGA, and MSGB, so that the terminal in the RRC idle state or RRC inactive state can also complete the positioning process directly, which reduces the terminal positioning delay and energy consumption of the terminal.

The process of the positioning method described in the embodiments of the present disclosure will be illustrated below in conjunction with specific application.

Application 1

When the downlink positioning method is used and based on the network positioning method, at least one of the preamble, MSG3, MSGA and MSG5 sent by the terminal during the random access process carries the positioning information, and/or, at least one of MSG2, MSG4 and MSGB sent by the base station or TRP during the random access process carries the positioning information, and the terminal, base station or TRP and LMF complete the positioning process according to the above positioning information.

For the downlink positioning method DL-TDOA, for users in the RRC idle state or RRC inactive state, as shown in FIG. 3, the specific positioning process based on the random access information used for positioning is as follows:

gNB1, gNB2, gNB3, and gNB4 respectively send periodic DL-PRS signals to UE;

The UE in the RRC idle state or in the RRC inactive state obtains the DL-TDOA assistance data provided by the LMF by monitoring the positioning system information block (SIB) message, and learns that the gNB around the UE sends a downlink positioning reference signal (DL-PRS) configuration information, by receiving the DL-PRS of each gNB, estimates the TOA measurement value with each gNB first, and then calculates and obtains the DL-PRS RSTD.

In this embodiment, a network-based positioning method is used to calculate the position of the UE.

Based on the random access process used for positioning, the UE reports the obtained DL-PRS RSTD measurement value to the LMF through the MSG3 message in the random access process, and the LMF calculates the position of the UE by using the reported measurement value and other known information (such as geographic coordinates of the gNBs) to.

Afterwards, the MSG4 sent by the base station or the TRP carries the positioning calculation result or UE position information.

In this application, MSG3 and MSG4 are used to carry positioning information, so that terminals in RRC idle state or RRC inactive state can also directly complete the positioning process, thereby reducing terminal positioning delay and terminal energy consumption.

Application 2

When the uplink positioning method is used and based on the network positioning method, at least one of the preamble, MSG3, MSGA and MSG5 information sent by the terminal during the random access process carries positioning information, and/or, at least one of MSG2, MSG4 and MSGB sent by the base station or TRP during the access process carries positioning information, and the terminal, base station or TRP and LMF complete the positioning process according to the positioning information.

Figure 4:
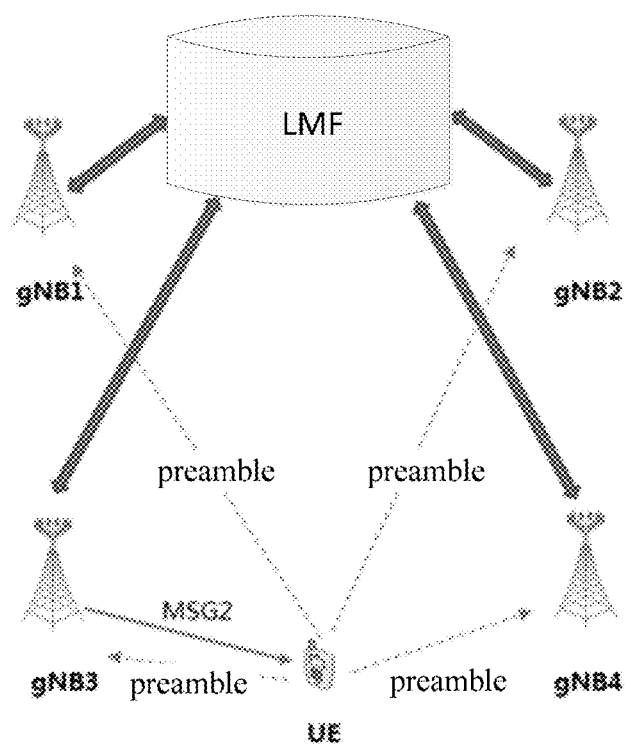
FIG. 4 is a second schematic diagram of the system architecture using the positioning method described in the embodiment of the present disclosure.

For the uplink positioning method UL-TDOA, and a network-based positioning method is adopted, for users in the RRC idle state or RRC inactive state, as shown in FIG. 4, the positioning process based on the random access information used for positioning includes:

A UE in the RRC idle state or in the RRC inactive state sends a preamble as an uplink positioning reference signal to gNB1, gNB2, gNB3, and gNB4;

The gNBs obtain the preamble auxiliary data from the LMF and learn the configuration information of the preamble sent by the UE. The gNBs estimate the TOA measurement value between each gNB and the UE by receiving the preamble sent by the UE, and then calculate and obtain RTOA.

In this embodiment, a network-based positioning method is used to calculate the position of the UE.

The gNBs report the obtained RTOA measurement values to the LMF, and the LMF calculates the position of the UE by using the reported measurement value and other known information (such as the geographical coordinates of the gNBs).

Afterwards, the MSG2 sent by the base station or the TRP carries the positioning calculation result or UE position information.

In this application, the positioning information is carried by the preamble and MSG2, so that the terminal in the RRC idle state or RRC inactive state can also directly complete the positioning process, thereby reducing the terminal positioning delay and energy consumption of the terminal.

Application 3

When downlink and uplink joint positioning is used and based on the network, at least one of the preamble, MSG3, MSGA, and MSG5 sent by the terminal during the random access process carries the positioning information, and/or, at least one of MSG2, MSG4 and MSGB sent by the base station or TRP during the random access process carries the positioning information, and the terminal, base station or TRP and LMF complete the positioning process according to the positioning information.

Figure 5:
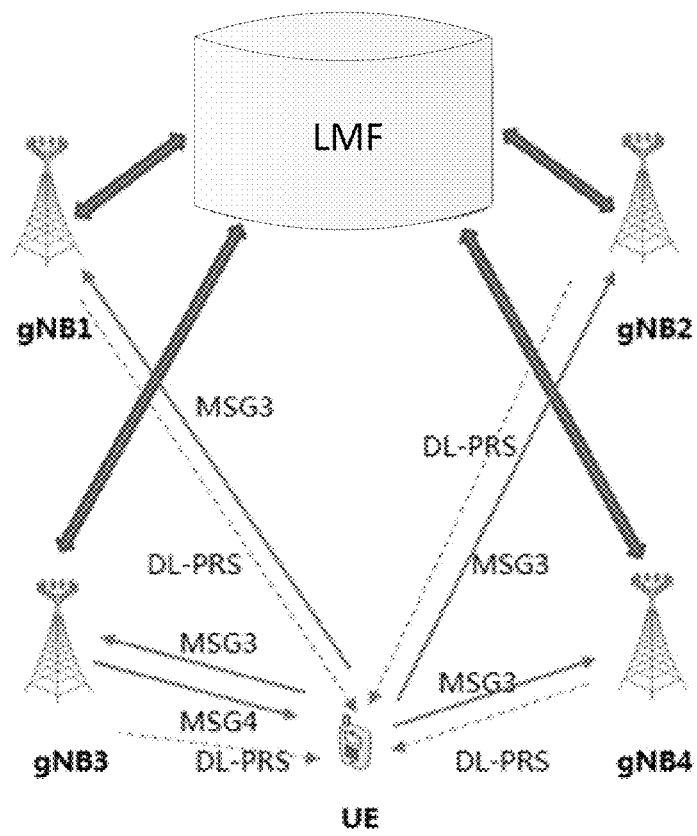
FIG. 5 is a third schematic diagram of the system architecture using the positioning method described in the embodiment of the present disclosure.

When the downlink and uplink joint positioning method Multi-RTT is used, and based on the network, for users in the RRC idle state or RRC inactive state, as shown in FIG. 5, the specific positioning process based on random access information for positioning includes:

gNB1, gNB2, gNB3, and gNB4 respectively send periodic DL-PRS signals to UE;

The UE in the RRC idle state or in the RRC inactive state obtains the DL-TDOA assistance data provided by the LMF by monitoring the positioning SIB message, and learns that the gNBs around the UE send the configuration information of the downlink positioning reference signal (DL-PRS), first estimate the TOA measurement value with each gNB by receiving the DL-PRS of each gNB, and then calculate and obtain the UE sending and receiving time difference (UE RX-TX Time Difference).

A UE in the RRC idle state or in the RRC inactive state sends MSG3 as an uplink positioning reference signal to gNB1, gNB2, gNB3, and gNB4, and MSG3 carries UE RX-TX Time Difference information.

These gNBs obtain UL-TDOA assistance data from the LMF and learns the configuration information of the MSG3 sent by the UE. These gNBs estimate the TOA measurement value between each gNB and the UE by receiving the MSG3 sent by the UE, and then calculate and obtain the gNB RX-TX time difference.

The UE RX-TX Time Difference obtained by these gNBs from MSG3, and the gNB RX-TX Time Difference calculated by the gNB and other known information (such as the geographic coordinates of the gNBs) are used to calculate the position of the UE by using a network-based positioning method.

The gNBs report the obtained UE RX-TX time difference and the gNB RX-TX time difference to the LMF, and the LMF calculates the position of the UE by using the reported measurement value and other known information (such as the geographical coordinates of the gNBs).

Afterwards, the MSG4 sent by the base station or the TRP carries the positioning calculation result or UE position information.

In this application, the downlink and uplink joint positioning method is used, and based on the network, MSG3 and MSG4 are used to carry positioning information, so that terminals in RRC idle state or RRC inactive state can also directly complete the positioning process, thereby reducing the terminal positioning delay and the energy consumption of the terminal.

Application 4

When the downlink positioning method is used and based on terminal, at least one of the preamble, MSG3, MSGA and MSG5 sent by the terminal during the random access process carry the positioning information, and/or, at least one of MSG2, MSG4 and MSGB sent by the base station or TRP during the random access process carries positioning information, and the terminal, base station or TRP and LMF complete the positioning process according to the above positioning information.

Figure 6:
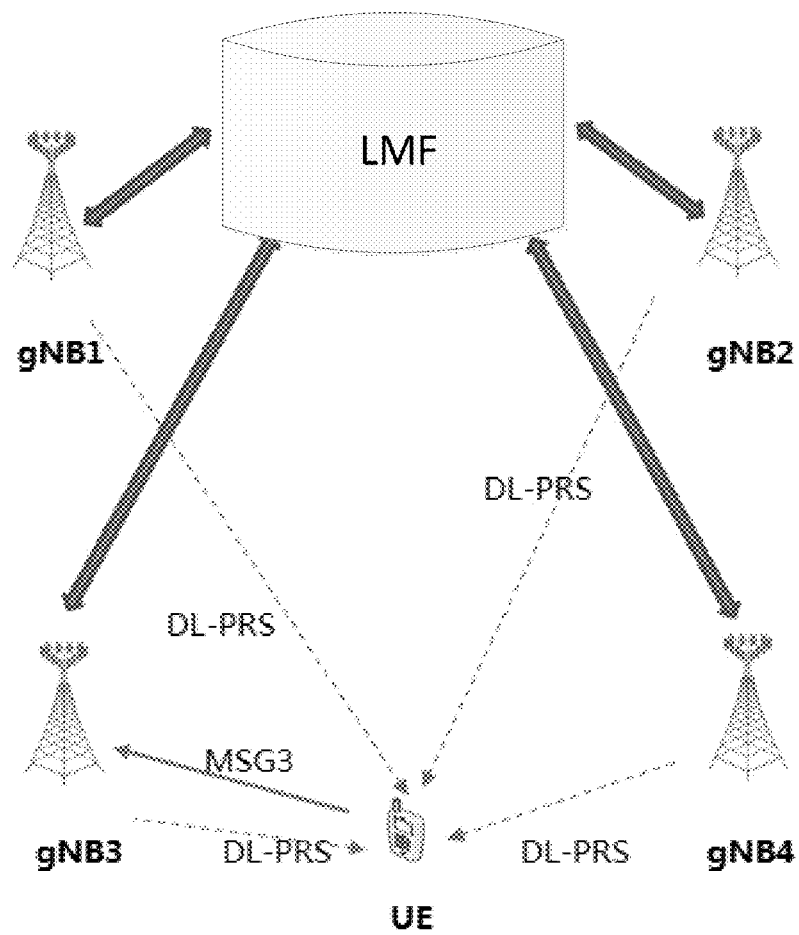
FIG. 6 is a fourth schematic diagram of the system architecture using the positioning method described in the embodiment of the present disclosure.

For the downlink positioning method DL-TDOA, and UE-based positioning method is adopted, users in RRC idle state or RRC inactive state, as shown in FIG. 6, the specific positioning process based on the random access information for positioning includes:

gNB1, gNB2, gNB3, and gNB4 respectively send periodic DL-PRS signals to UE;

The UE in the RRC idle state or in the RRC inactive state obtains the DL-TDOA assistance data provided by the LMF by monitoring the positioning SIB message, and learns the configuration information of the downlink positioning reference signal (DL-PRS) sent by the gNBs around the UE, first estimate the TOA measurement value with each gNB by receiving the DL-PRS of each gNB, and then calculate and obtain DL-PRS RSTD.

Therefore, in this embodiment, a terminal-based positioning method is used to calculate the position of the UE. The UE uses the obtained DL-PRS RSTD and other information provided by the network (such as the geographical coordinates of the gNBs) to calculate the position of the UE.

Based on the random access process for positioning, the UE reports the positioning calculation result or calculated UE position information to the serving base station or LMF through the MSG3 message in the random access process.

In this application, the downlink positioning method is used and based on terminal, the positioning information is carried through MSG3, so that the terminal in the RRC idle state or RRC inactive state can also directly complete the positioning process, thereby reducing the terminal positioning delay and reducing the terminal energy consumption.

Application 5

When the uplink positioning method is used and based on the terminal positioning method, at least one of the preamble, MSG3, MSGA and MSG5 information sent by the terminal during the random access process carries positioning information, and/or, at least one of MSG2, MSG4 and MSGB sent by the base station or TRP during the random access process carries positioning information, and the terminal, base station or TRP and LMF complete the positioning process according to the positioning information.

Figure 7:
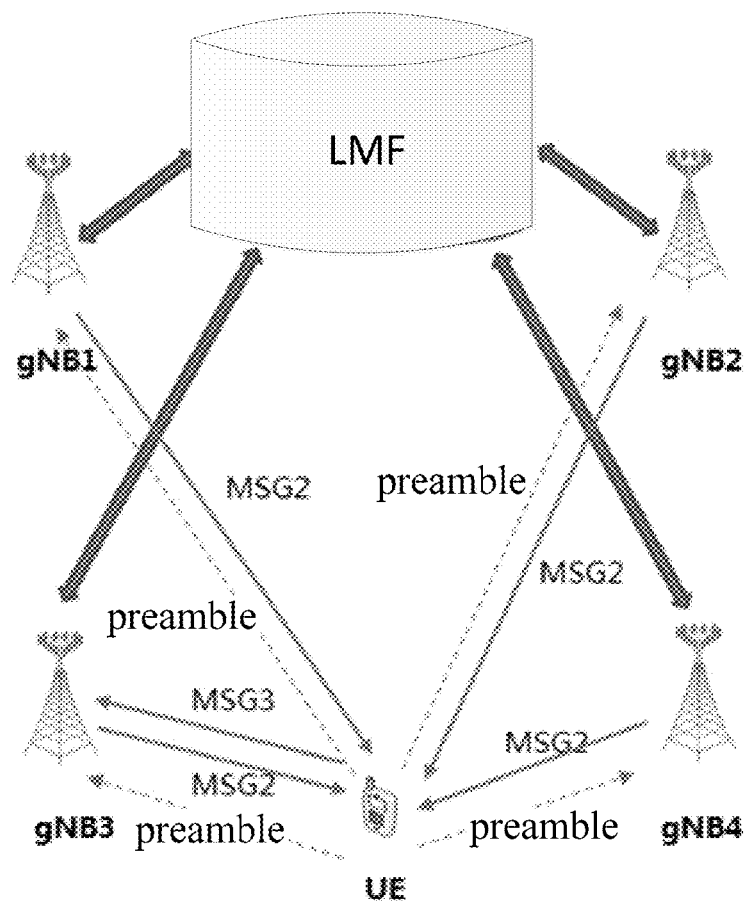
FIG. 7 is a fifth schematic diagram of the system architecture using the positioning method described in the embodiment of the present disclosure.

For the uplink positioning method UL-TDOA, and the UE-based positioning method is used, the user in the RRC idle state or RRC inactive state, as shown in FIG. 7, the positioning process based on the random access information used for positioning includes:

A UE in the RRC idle state or in the RRC inactive state sends a preamble as an uplink positioning reference signal to gNB1, gNB2, gNB3, and gNB4;

The gNBs obtain the preamble auxiliary data from the LMF and learns the configuration information of the preamble sent by the UE. The gNB estimates the TOA measurement value between each gNB and the UE by receiving the preamble sent by the UE, and then calculates the relative arrival Time (RTOA).

Therefore, this application adopts a terminal-based positioning method to calculate the position of the UE. Based on the random access process for positioning, these gNBs send the RTOA measurement value to the UE through the MSG2 message in the random access process, and the UE calculates the position of the UE by using the RTOA measurement value sent by the gNBs and other known information (such as the geographical coordinates of those gNBs).

Afterwards, the MSG3 sent by the UE carries the positioning calculation result or the UE position information.

In this application, the uplink positioning method and the terminal-based positioning method are used, the preamble, MSG2 and MSG3 carry positioning information respectively, so that the terminal in the RRC idle state or RRC inactive state can also directly complete the positioning process, thereby reducing the terminal positioning delay, and reducing the energy consumption of the terminal.

Application 6

When the downlink and uplink joint positioning method is used, and based on the terminal, the terminal sends positioning information carried in at least one of the preamble, MSG3, MSGA and MSG5 sent during the random access process, and/or, at least one of MSG2, MSG4 and MSGB sent by the base station or TRP during the random access process carries the second positioning information, and the terminal, base station or TRP and LMF complete the positioning process according to the positioning information.

For the downlink and uplink joint positioning method Multi-RTT is used, and UE-based positioning method is used, users in RRC idle state or RRC inactive state, as shown in FIG. 8, the specific positioning process based on the random access information for positioning includes:

A UE in the RRC idle state or in the RRC inactive state sends a preamble as an uplink positioning reference signal to gNB1, gNB2, gNB3, and gNB4;

The gNBs obtain the preamble auxiliary data from the LMF, and learns the configuration information of the preamble sent by the UE. The gNB estimates the TOA measurement value between each gNB and the UE by receiving the preamble sent by the UE, and then calculates and obtains gNB RX-TX Time Difference.

Based on the random access process used for positioning, the gNBs send the measured value of the gNB RX-RX time difference to the UE through the MSG2 message in the random access process.

The UE in the RRC idle state or in the RRC inactive state obtains the auxiliary data provided by the LMF by monitoring the positioning SIB message, and learns the configuration information of the MSG2 sent by the gNBs around the UE, estimates the TOA measurement value with each gNB by receiving MSG2 of each gNB, then calculates and obtains the UE RX-TX Time Difference, and the UE can also obtain the gNB RX-TX Time Difference from the MSG2 information sent by each gNB.

The gNB RX-TX Time Difference obtained by the UE from MSG2, as well as the UE RX-TX Time Difference calculated by the UE and other known information (such as the geographic coordinates of the gNBs) can be used to calculate the position of the UE by using terminal-based positioning method.

Afterwards, the MSG3 sent by the UE carries the positioning calculation result or the UE position information.

In this application, the downlink and uplink joint positioning method is used and the terminal-based positioning method is used, MSG2 and MSG3 carry positioning information, so that the terminal in the RRC idle state or RRC inactive state can also directly complete the positioning process, thereby reducing the terminal positioning delay and reducing the terminal energy consumption.

An embodiment of the present disclosure also provides a positioning method, which is applied to a second network device, and the second network device is one of a terminal and a network side device, as shown in FIG. 9, the positioning method includes:

S910. Receiving first information related to a random access process sent by a first network device, wherein the first information includes positioning information, and the first network device is one of a terminal and a network side device that is different from the second network device;

Wherein, the positioning information includes at least one of the following information:

an uplink positioning reference signal, configuration information of the uplink positioning reference signal, a downlink positioning reference signal, configuration information of the downlink positioning reference signal, a positioning measurement value, a positioning calculation result or terminal position information.

Optionally, the positioning method further includes:

Performing a terminal positioning process according to the positioning information.

Optionally, in the positioning method, wherein the second network device is a network side device, and for the first type of random access process, the first information is at least one of a preamble, message 3 and message 5 in the first type of random access process; for the second type of random access process, the first information is message A in the second type of random access process.

Optionally, in the positioning method, wherein the second network device is a terminal, and for the first type of random access process, the first information is at least one of message 2 and message 4 in the first type of random access process; for the second type of random access process, the first information is message B in the second type of random access process.

Optionally, the positioning method further includes:

Sending second information related to the random access process, wherein the second information includes positioning information.

Optionally, in the positioning method, wherein the second network device is a terminal, and for the first type of random access process, the second information is at least one of the preamble, message 3 and message 5 in the first type of random access process; for the second type of random access process, the second information is message A in the second type of random access process.

Optionally, in the positioning method, wherein the second network device is a network side device, and for the first type of random access process, the second information is at least one of message 2 and message 4 in the first type of random access process; for the second type of random access process, the second information is message B in the second type of random access process.

Optionally, in the positioning method, when the second network device is a network side device, the positioning information includes at least one of the following:

The uplink positioning reference signal, the configuration information of the uplink positioning reference signal, the positioning measurement value, the positioning calculation result and the terminal position information.

Optionally, in the positioning method, when the second network device is a terminal, the positioning information includes at least one of the following:

The downlink positioning reference signal, the configuration information of the downlink positioning reference signal, the positioning measurement value, the positioning calculation result and the terminal position information.

Optionally, in the positioning method, the second network device is a network side device, and when using a downlink positioning method and a network-based positioning method, receiving the first information related to the random access process sent by the first network device, and sending second information related to the random access process, including:
  Receiving, by the network side device, first information carrying positioning information sent by the terminal after receiving the downlink positioning reference signal; the first information is at least one of message 3, message A and message 5, and the positioning information in the first information includes positioning measurement value;
  After the position management function unit LMF completes the position calculation according to the positioning measurement value, and outputs the position measurement calculation result and/or the terminal position information, the network side device sends the second information carrying the position information; the second information is message 2, message 4 or message B; the positioning information in the second information includes positioning measurement calculation result and/or terminal position information.

Optionally, in the positioning method, wherein the second network device is a network side device, an uplink positioning method is used and based on network positioning, receiving first information related to the random access process sent by the first network device and sending second information related to the random access process, including:
  Receiving, by the network side device, first information sent by the terminal; the first information is a preamble, message 3, message 5 or message A, as an uplink positioning reference signal;
  After the network side device measures the preamble, message 3, message 5 or message A, reports the positioning measurement value to the position management function unit LMF, the LMF completes position calculation based on the positioning measurement value, and outputs the position measurement calculation result and/or the terminal position information, the network side device sending second information carrying positioning information, wherein the second information is at least one of message 2, message 4 and message B, and the positioning information in the second information includes positioning measurement calculation result and/or terminal position information.

Optionally, in the positioning method, wherein the second network device is a network side device, a downlink and uplink joint positioning method is used and based on network positioning, the receiving the first information related to the random access process sent by the first network device and sending the second information related to the random access process, including:
  Receiving, by the network side device, the first information carrying position information sent by the terminal; the first information is at least one of message 3, message A and message 5; the position information in the first information includes a first positioning measurement value;
  After the network side device obtains the first positioning measurement value, obtains the second positioning measurement value through message 3, message A or message 5, and reports the first positioning measurement value and the second positioning measurement value to the LMF, the LMF completes the position calculation based on the first positioning measurement value and the second positioning measurement value, and obtains the position measurement calculation result and/or terminal position information, the network side device sending second information carrying positioning information; wherein the second information is at least one of message 2, message 4, and message B, and the positioning information in the second information includes positioning measurement calculation result and/or terminal position information.

Optionally, in the positioning method, wherein the second network device is a network side device, when the downlink positioning method is used and based on terminal positioning, the receiving the first information related to the random access process sent by the first network device, includes:
  Receiving, by the network side device, the first information carrying positioning information sent by the terminal; the first information is at least one of message 3, message A, and message 5, and the positioning information includes positioning measurement calculation result and/or terminal position information.

Optionally, in the positioning method, wherein the second network device is a network side device, when the uplink positioning method is used and based on terminal positioning, the receiving the first information related to the random access process sent by the first network device, and sending second information related to the random access process, includes:
  Receiving, by the network side device, the preamble, message 3, message 5 or message A sent by the terminal, and the preamble, message 3, message 5 or message A is used as an uplink positioning reference signal;
  After the network side device measures the preamble, message 3, message 5 or message A, sending second information carrying positioning information, the second information is at least one of message 2, message 4 and message B, the positioning information in the second information includes a positioning measurement value;
  Receiving, by the network side device, first information including positioning information sent by the terminal, the first information is message 3, message A or message 5, and the positioning information in the first information includes positioning measurement calculation result and/or terminal position information.

Optionally, in the positioning method, wherein the second network device is a network side device, and when downlink and uplink joint positioning method is adopted and based on terminal positioning, the receiving first information related to the random access process sent by the first network device and sending the second information related to the random access process, includes:
  Receiving, by the network side device, the preamble, message 3, message 5 or message A sent by the terminal, and the preamble, message 3, message 5 or message A being used as an uplink positioning reference signal;
  Sending, by the network side device, second information carrying positioning information, where the second information is message 2, message 4, or message B; the positioning information in the second information includes a first positioning measurement value;
  After the terminal receives the message 2, message 4 or message B, obtains the first positioning measurement value, and obtains a second positioning measurement value by measuring the message 2, message 4 or message B; and completes the positioning calculation according to the first positioning measurement value and the second positioning measurement value, the network side device receiving the first information carrying positioning information sent by the terminal, and the first information is at least one of message 3, message A and message 5; wherein, the positioning information in the first information includes positioning measurement calculation result and/or terminal position information.

Optionally, in the positioning method, wherein the second network device is a terminal, and when a downlink positioning method is used and based on a network positioning, the receiving the first information related to the random access process sent by the first network device, and sending second information related to the random access process, including:

After receiving the downlink positioning reference signal, sending, by the terminal, second information including positioning information; the second information is at least one of message 3, message A, and message 5; the positioning information in the second information is positioning measurement value;

after the LMF completes the position calculation according to the positioning measurement value, and outputs the position measurement calculation result and/or the terminal position information, receiving, by the terminal, the first information carrying the position information sent by the network side device; wherein the first information is message 2, message 4 or message B; the positioning information in the first information includes a positioning measurement calculation result and/or terminal position information.

Optionally, in the positioning method, wherein the second network device is a terminal, an uplink positioning method is used and based on network positioning, the receiving the first information related to the random access process sent by the first network device includes:

Sending, by the terminal, the preamble, message 3, message 5 or message A as an uplink positioning reference signal;

After the network side device measures the preamble, message 3, message 5 or message A, reports the positioning measurement value to the position management function unit LMF, the LMF completes the position calculation based on the positioning measurement value, and outputs the position measurement calculation result and/or the terminal position information, receiving, by the terminal, the first information carrying positioning information sent by the network side device, wherein the first information is at least one of message 2, message 4, and message B, the positioning information in the first information includes a positioning measurement calculation result and/or terminal position information.

Optionally, in the positioning method, wherein, the second network device is a terminal, a downlink and uplink joint positioning method is used and based on network positioning, the receiving the first information related to the random access process sent by the first network device, and sending second information related to the random access process, including:

Receiving, by the terminal, the downlink positioning reference signal, and sending second information including positioning information; the second information is at least one of message 3, message A, and message 5; the positioning information in the second information is the first positioning measurement value;

after the network side device obtains the first positioning measurement value, obtains the second positioning measurement value through message 3, message A or message 5, and reports the first positioning measurement value and the second positioning measurement value to the positioning management function unit LMF, and the LMF completes the positioning calculation based on the first positioning measurement value and the second positioning measurement value, and obtains the positioning measurement calculation result and/or terminal position information, receiving, by the terminal, the first information carrying positioning information sent by the network side device; wherein the first information is at least one of message 2, message 4, and message B, and the positioning information in the first information includes positioning measurement calculation result and/or terminal position information.

Optionally, in the positioning method, wherein the second network device is a terminal, when the uplink positioning method is used and based on terminal positioning, the receiving the first information related to the random access process sent by the first network device, and sending second information related to the random access process, including:

Sending, by the terminal, the preamble, message 3, message 5 or message A as an uplink positioning reference signal;

after the network side device measures the preamble, message 3, message 5 or message A, receiving, by the terminal, the first information carrying positioning information sent by the network side device, wherein the first information is at least one of message 2, message 4 and message B, the positioning information in the first information includes a positioning measurement value;

sending, by the terminal, the second information including positioning information, wherein the second information is message 3, message A or message 5, and the positioning information in the second information includes positioning measurement calculation result and/or terminal position information.

Optionally, in the positioning method, wherein the second network device is a terminal, and when downlink and uplink joint positioning is adopted and based on terminal positioning, receiving the first information related to the random access process sent by the first network device, and sending second information related to the random access process, including:

Sending, by the terminal, the preamble, message 3, message 5 or message A as an uplink positioning reference signal;

Receiving, by the terminal, first information carrying positioning information sent by the network side device, the first information is message 2, message 4 or message B; the positioning information in the first information includes the first positioning measurement value;

after the terminal receives the message 2, message 4 or message B, obtains the first positioning measurement value, and obtains a second positioning measurement value by measuring the message 2, message 4 or message B; and completes the positioning calculation according to the first positioning measurement value and the second positioning measurement value, sending, by the terminal, second information carrying positioning information, wherein the second information is at least one of message 3, message A, and message 5;

the positioning information in the second information includes positioning measurement calculation result and/or terminal position information.

Figure 10:
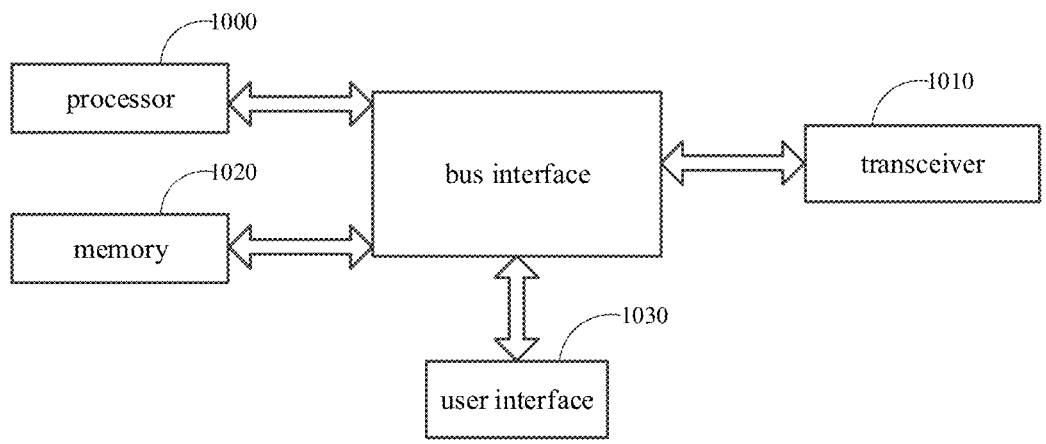
FIG. 10 is a first implementation of the network device described in the embodiment of the present disclosure.

An embodiment of the present disclosure also provides a network device, where the network device is a first network device. Optionally, the first network device is one of a terminal and a network side device, for example, the first network device is a terminal, as shown in FIG. 10, including a memory 1020, a transceiver 1010, a processor 1000, and a user interface 1030; the bus architecture may include any number of interconnected buses and bridges, specifically various circuits of one or more processors represented by the processor 1000 and the memory represented by the memory 1020 are linked together. The bus architecture can also link together various other circuits such as peripherals, voltage regulators, and power management circuits, etc., which are well known in the art and therefore will not be further described herein. The bus interface provides the interface. Transceiver 1010 may be a plurality of elements, including transmitters and receivers, providing means for communicating with various other devices over transmission medium, including wireless channels, wired channels, optic cables, etc. For different UEs, the user interface 1030 may also be an interface capable of connecting externally and internally to required device, and the connected device includes but not limited to a keypad, a display, a speaker, a microphone, a joystick, and the like.

The processor 1000 is responsible for managing the bus architecture and general processing, and the memory 1020 can store data used by the processor 1000 when performing operations.

Optionally, the processor 1000 may be a central processing unit (CPU), an application specific integrated circuit (ASIC), a field-programmable gate array (FPGA) or a complex programmable logic device (CPLD), the processor can also adopt a multi-core architecture.

The processor is used to execute any one of the methods provided in the embodiments of the present disclosure according to the obtained executable instructions by calling the computer program stored in the memory. The processor and memory may also be physically separated.

Specifically, the memory 1020 is used to store computer programs; the transceiver 1010 is used to send and receive data under the control of the processor 1000; the processor 1000 is used to read the computer programs in the memory 1020 and perform the following operations:
  sending first information related to a random access process, wherein the first information includes positioning information;
  The positioning information includes at least one of the following information:
  an uplink positioning reference signal, configuration information of the uplink positioning reference signal, a downlink positioning reference signal, configuration information of the downlink positioning reference signal, a positioning measurement value, a positioning calculation result or terminal position information.

Optionally, for the network device, wherein the first network device is a terminal, and for the first type of random access process, the first information is at least one of the preamble and message 3 and message 5 in the first type of random access process; for the second type of random access process, the first information is message A in the second type of random access process.

Optionally, in the network device, wherein the processor 1000 is further configured to:
  receive second information related to the random access process sent by a second network device, wherein the second information includes positioning information; the second network device is one of a terminal and a network side device that is different from the first network device.

Optionally, for the network device, wherein the first network device is a terminal, and for the first type random access process, the second information is at least one of message 2 and message 4; for the second type of random access process, the second information is message B in the second type of random access process.

Optionally, the positioning information includes at least one of the following:
  The uplink positioning reference signal, the configuration information of the uplink positioning reference signal, the positioning measurement value, the positioning calculation result and the terminal position information.

Optionally, the positioning information includes at least one of the following:
  The downlink positioning reference signal, the configuration information of the downlink positioning reference signal, the positioning measurement value, the positioning calculation result and the terminal position information.

Optionally, in the network device, wherein the processor 500 is further configured to:
  obtaining first assistance data sent by the position management function unit LMF; the first assistance data includes configuration information of at least one of the preamble, message 3, message 5 and message A sent by the terminal during the random access process; and/or
  Obtaining second assistance data sent by the LMF; the second assistance data includes configuration information of at least one of message 2, message 4, and message B sent by other network side devices during the random access process.

Optionally, in the network device, wherein the first network device is a terminal, the processor 500 uses a downlink positioning method and based on the network positioning, the sending the first information related to the random access process, and receiving the second information related to the random access process sent by the network device includes:
  After receiving the downlink positioning reference signal, the terminal sending first information carrying positioning information; the first information is at least one of message 3, message A and message 5, and the positioning information in the first information includes the positioning measurement result;
  After the position management function unit LMF completes the position calculation according to the positioning measurement value, and outputs the position measurement calculation result and/or the terminal position information, the terminal receiving the second information carrying the position information sent by the network side device; the second information is message 2, message 4 or message B; the positioning information in the second information includes a positioning measurement calculation result and/or terminal position information.

Optionally, in the network device, wherein the first network device is a terminal, the processor 1000 adopts an uplink positioning method, and based on the network positioning, the sending the first information related to the random access process, and receiving the second information related to the random access process sent by the second network device includes:

The terminal sending the first information; the first information is a preamble, message 3, message 5 or message A, as an uplink positioning reference signal;

After the network side device measures the preamble, message 3, message 5 or message A, reports the positioning measurement value to the position management function unit LMF, the LMF completes the position calculation based on the positioning measurement value, and outputs the position measurement calculation result and/or the terminal position information, the terminal receiving second information carrying positioning information sent by the network side device, and the second information is at least one of message 2, message 4 and message B, the positioning information in the second information includes a positioning measurement calculation result and/or terminal position information.

Optionally, in the network device, wherein the first network device is a terminal, the processor 1000 adopts a joint downlink and uplink positioning method, and based on network positioning, the sending first information related to a random access process and receiving the second information related to the random access process sent by the second network device includes at least one of the following steps:

After receiving the downlink positioning reference signal, the terminal sending first information carrying positioning information; the first information is at least one of message 3, message A and message 5; the positioning information in the first information includes the first positioning measurement value;

After the network side device obtains the first positioning measurement value, obtains the second positioning measurement value through message 3, message A or message 5, and reports the first positioning measurement value and the second positioning measurement value to the LMF, the LMF completes the positioning calculation based on the first positioning measurement value and the second positioning measurement value, and obtains the positioning measurement calculation result and/or terminal position information, the terminal receiving the second information carrying positioning information sent by the network side device; the second information is at least one of message 2, message 4, and message B, and the positioning information in the second information includes the positioning measurement calculation result and/or terminal position information.

Optionally, in the network device, wherein the first network device is a terminal, the processor 1000 adopts the downlink positioning method and based on terminal positioning, the sending the first information related to the random access process, includes:

After receiving the downlink positioning reference signal, the terminal sending the first information carrying positioning information; the first information is at least one of message 3, message A and message 5, and the positioning information includes the positioning measurement calculation result and/or the terminal position information.

Optionally, in the network device, wherein the first network device is a terminal, the processor 1000 adopts the uplink positioning method and based on the terminal positioning, the sending the first information related to the random access process and receiving the second information related to the random access process sent by the second network device includes:

The terminal sending a preamble, message 3, message 5 or message A as an uplink positioning reference signal;

After the network side device measures the preamble, message 3, message 5 or message A, the terminal receiving the second information carrying positioning information sent by the network side device, the second information is at least one of message 2, message 4 and message B, the positioning information in the second information includes a positioning measurement value;

The terminal sending the first information including positioning information, the first information is message 3, message A or message 5, and the positioning information in the first information includes positioning measurement calculation result and/or terminal position information.

Optionally, in the network device, wherein the first network device is a terminal, the processor 1000 adopts the downlink and uplink joint positioning method and based on terminal positioning, the sending the first information related to the random access process and receiving second information related to the random access process sent by the second network device, includes:

The terminal sending a preamble, message 3, message 5 or message A as a uplink positioning reference signal;

The terminal receiving the second information carrying positioning information sent by the network side device, the second information is message 2, message 4 or message B; the positioning information in the second information includes a first positioning measurement value;

After the terminal receives the message 2, message 4 or message B, obtains the first positioning measurement value, and obtains a second positioning measurement value by measuring the message 2, message 4 or message B; and completes the positioning calculation according to the first positioning measurement value and the second positioning measurement value, the terminal sending first information carrying positioning information, the first information is at least one of message 3, message A and message 5; wherein, the positioning information in the first information includes positioning measurement calculation result and/or terminal position information.

Figure 11:
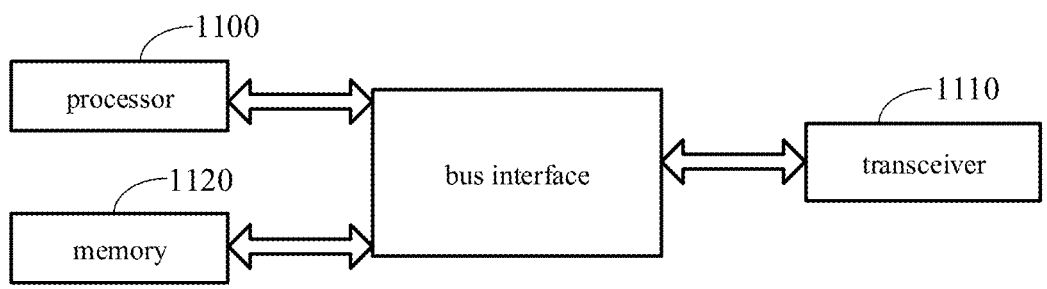
FIG. 11 is a second implementation of the network device described in the embodiment of the present disclosure.

An embodiment of the present disclosure also provides a network device, where the network device is a first network device. Optionally, the first network device is one of a terminal and a network side device, for example, the first network device is a network side device, as shown in FIG. 11, including a memory 1120, a transceiver 1110, and a processor 1100; the bus architecture may include any number of interconnected buses and bridges, specifically various circuits of one or more processors represented by the processor 1100 and the memory represented by the memory 1120 are linked together. The bus architecture can also link together various other circuits such as peripherals, voltage regulators, and power management circuits, etc., which are well known in the art and therefore will not be further described herein. The bus interface provides the interface. Transceiver 1110 may be a plurality of elements, including a transmitter and a receiver, providing a unit for communicating with various other devices over transmission medium, including wireless channels, wired channels, optical cables, and other transmission medium. The processor 1100 is responsible for managing the bus architecture and general processing, and the memory 1120 can store data used by the processor 1100 when performing operations.

The processor 1100 may be a CPU, ASIC, FPGA or CPLD, and the processor may also adopt a multi-core architecture.

Specifically, the memory 1120 is used to store computer programs; the transceiver 1110 is used to send and receive data under the control of the processor; the processor 1100 is used to read the computer programs in the memory and perform the following operations:

Sending first information related to the random access process, wherein the first information includes positioning information; the positioning information includes at least one of the following information:

an uplink positioning reference signal, configuration information of the uplink positioning reference signal, a downlink positioning reference signal, configuration information of the downlink positioning reference signal, a positioning measurement value, a positioning calculation result and terminal position information.

Optionally, the network device, wherein the first network device is a network side device, and for a first type of random access process, the first information is at least one of message 2 or messages 4; for a second type of random access process, the first information is message B in the second type of random access process.

Optionally, the network device, wherein the processor 1100 is further configured to:

receive second information related to the random access process sent by a second network device, wherein the second information includes positioning information; wherein the second network device is one of a terminal and a network side device that is different from the first network device.

Optionally, in the network device, wherein the first network device is a network side device, and for the first type of random access process, the second information is at least one of a preamble, message 3 and message 5 in the first type of random access process; for the second type of random access process, the second information is message A in the second type of random access process.

Optionally, the network device, wherein the processor 1100 is further configured to:

obtain first assistance data sent by the LMF; the first assistance data includes configuration information of at least one of the preamble, message 3, message 5 and message A sent by the terminal during the random access process; and/or obtain second assistance data sent by the LMF; the second assistance data includes configuration information of at least one of message 2, message 4, and message B sent by other network side devices during the random access process.

Optionally, in the network device, wherein the first network device is a network side device, the processor 1100 uses a downlink positioning method, and based on a network positioning, the sending the first information, receiving second information related to the random access process sent by the second network device, includes:

Receiving, by the network side device, second information including positioning information sent by the terminal; the second information is at least one of message 3, message A, and message 5; the positioning information in the second information is a positioning measurement value;

After the LMF completes the position calculation according to the positioning measurement value, and outputs the position measurement calculation result and/or the terminal position information, the network side device sending the first information carrying the position information; the first information is message 2, message 4 or message B; the positioning information in the first information includes positioning measurement calculation result and/or terminal position information.

Optionally, in the network device, wherein the first network device is a network side device, the processor 1100 adopts an uplink positioning method, and based on the network positioning, the sending the first information related to the random access process includes:

After the terminal sends the preamble, message 3, message 5 or message A as the uplink positioning reference signal, the network side device measures the preamble, message 3, message 5 or message A, and reports the positioning measurement value to the LMF, the LMF completes the positioning calculation based on the positioning measurement value, and outputs the positioning measurement calculation result and/or the terminal position information, the network side device sending the first information carrying the positioning information, and the first information is at least one of message 2, message 4, and message B, and the positioning information in the first information includes a positioning measurement calculation result and/or terminal position information.

Optionally, in the network device, wherein the first network device is a network side device, the processor 1100 adopts a downlink and uplink joint positioning method, and when positioning based on the network, sends information related to the random access process The first information, including at least one of the following steps:

After the terminal receives the downlink positioning reference signal and sends at least one of message 3, message A, and message 5 including the first positioning measurement value, the network side device obtains the first positioning measurement value, and obtains the second positioning measurement value through message 3, message A or message 5, reports the first positioning measurement value and the second positioning measurement value to the LMF, the LMF completes the positioning calculation based on the first positioning measurement value and the second positioning measurement value, and obtains the positioning measurement calculation result and/or the terminal position information, the network side device sending the first information carrying the positioning information; the first information is at least one of message 2, message 4 and message B, the positioning information in the first information includes positioning measurement calculation result and/or terminal position information.

Optionally, in the network device, wherein the first network device is a network side device, when the processor 1100 uses an uplink positioning method and based on terminal positioning, the sending the first information, receiving second information related to the random access process sent by the second network device, includes:

After the terminal sends the preamble, message 3, message 5 or message A as the uplink positioning reference signal, and the network side device measuring the preamble, message 3, message 5 or message A, the network side device sending the first information carrying the positioning information, the first information is at least one of message 2, message 4, and message B, and the positioning information in the first information includes a positioning measurement value;

The network side device receiving the second information including positioning information sent by the terminal, the second information is message 3, message A or message 5, and the positioning information in the second information includes positioning measurement calculation result and/or terminal position information.

Optionally, in the network device, wherein the first network device is a network side device, the processor 1100 adopts downlink and uplink joint positioning method and based on terminal positioning, the sending the first information related to the random access process, and receiving second information related to the random access process sent by the second network device, includes:

After the terminal sends the preamble, message 3, message 5 or message A as the uplink positioning reference signal, the network side device sending the first information carrying positioning information, and the first information is message 2, message 4 or message B; the positioning information in the first information includes a first positioning measurement value;

After the terminal receives the message 2, message 4 or message B, obtains the first positioning measurement value, and obtains a second positioning measurement value by measuring the message 2, message 4 or message B; and completes the positioning calculation according to the first positioning measurement value and the second positioning measurement value, the network side device receiving the second information carrying positioning information sent by the terminal, and the second information is at least one of message 3, message A and message 5; wherein, the positioning information in the second information includes positioning measurement calculation result and/or terminal position information.

Figure 12:
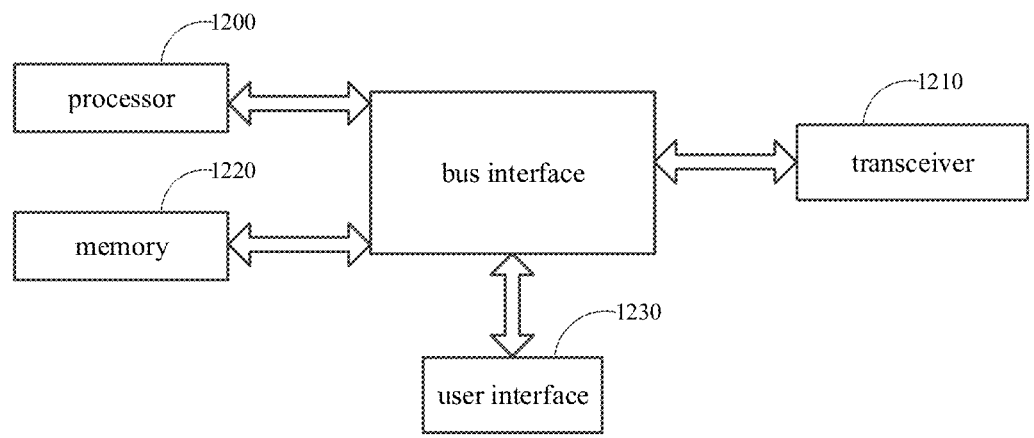
FIG. 12 is a third implementation of the network device described in the embodiment of the present disclosure.

An embodiment of the present disclosure also provides a network device, wherein the network device is a second network device. Optionally, the second network device is one of a terminal and a network side device, for example, the second network device is a terminal, as shown in FIG. 12, including a memory 1220, a transceiver 1210, a processor 1200, and a user interface 1230; the bus architecture may include any number of interconnected buses and bridges, specifically various circuits of one or more processors represented by the processor 1200 and the memory represented by the memory 1220 are linked together. The bus architecture can also link together various other circuits such as peripherals, voltage regulators, and power management circuits, etc., which are well known in the art and therefore will not be further described herein. The bus interface provides the interface. Transceiver 1210 may be a plurality of elements, including a transmitter and a receiver, providing means for communicating with various other devices over transmission medium, including wireless channels, wired channels, fiber optic cables, etc. For different user terminals, the user interface 1230 may also be an interface capable of connecting externally and internally to required device, and the connected device includes but not limited to a keypad, a display, a speaker, a microphone, a joystick, and the like.

The processor 1200 is responsible for managing the bus architecture and general processing, and the memory 1220 can store data used by the processor 1200 when performing operations.

Optionally, the processor 1200 may be a CPU, ASIC, FPGA or CPLD, and the processor may also adopt a multi-core architecture.

The processor is used to execute any one of the methods provided in the embodiments of the present application according to the obtained executable instructions by calling the computer program stored in the memory. The processor and memory may also be physically separated.

Specifically, the memory 1220 is used to store computer programs; the transceiver 1210 is used to send and receive data under the control of the processor 1200; the processor 1200 is used to read the computer programs in the memory 1220 and perform the following operations:

Receiving first information related to a random access process sent by a first network device, wherein the first information includes positioning information, and the first network device is one of a terminal and a network side device that is different from the second network device;

Wherein, the positioning information includes at least one of the following information:

an uplink positioning reference signal, configuration information of the uplink positioning reference signal, a downlink positioning reference signal, configuration information of the downlink positioning reference signal, a positioning measurement value, a positioning calculation result or terminal position information.

Optionally, the network device, wherein the processor 1200 is further configured to:

Perform a terminal positioning process according to the positioning information.

Optionally, the second network device is a terminal, and for the first type of random access process, the first information is at least one of message 2 and message 4 in the first type of random access process; for the second type of random access process, the first information is message B in the second type of random access process.

Optionally, the processor 1200 is further configured to:

Send second information related to the random access process, wherein the second information includes positioning information.

Optionally, the second network device is a terminal, and for the first type of random access process, the second information is at least one of the preamble, message 3 and message 5 in the first type of random access process; for the second type of random access process, the second information is message A in the second type of random access process.

Optionally, the second network device is a terminal, the positioning information includes at least one of the following:

a downlink positioning reference signal, configuration information of the downlink positioning reference signal, a positioning measurement value, a positioning calculation result and the terminal position information.

Optionally, in the network device, wherein the second network device is a terminal, and the processor 1200 adopts a downlink positioning method and based on a network positioning, the receiving the first information related to the random access process sent by the first network device, and sending the second information related to the random access process, includes:

After receiving the downlink positioning reference signal, the terminal sending second information including positioning information; the second information is at least one of message 3, message A, and message 5; the positioning information in the second information is a positioning measurement value;

After the LMF completes the position calculation according to the positioning measurement value, and outputs the position measurement calculation result and/or the terminal position information, the terminal receiving the first information carrying the position information sent by the network side device; the first information is message 2, message 4 or message B; the positioning information in the first information includes a positioning measurement calculation result and/or terminal position information.

Optionally, the second network device is a terminal, the processor 1200 adopts an uplink positioning method, and based on the network positioning, the receiving the first information related to the random access process sent by the first network device, includes:

Sending, by the terminal, the preamble, message 3, message 5 or message A as an uplink positioning reference signal;

After the network side device measures the preamble, message 3, message 5 or message A, reports the positioning measurement value to LMF, the LMF completes the position calculation based on the positioning measurement value, and outputs the position measurement calculation result and/or the terminal position information, receiving, by the terminal, first information carrying positioning information sent by the network side device, wherein the first information is at least one of message 2, message 4, and message B, the positioning information in the first information includes a positioning measurement calculation result and/or terminal position information.

Optionally, the second network device is a terminal, the processor 1200 adopts a downlink and uplink joint positioning method, and based on the network positioning, the receiving the first information related to the access process sent by the first network device, and sending the second information related to the random access process, includes:

Receiving, by the terminal, the downlink positioning reference signal, and sending second information including positioning information; the second information is at least one of message 3, message A, and message 5; the positioning information in the second information is the first positioning measurement value;

After the network side device obtains the first positioning measurement value, obtains the second positioning measurement value through message 3, message A or message 5, and reports the first positioning measurement value and the second positioning measurement value to the positioning management function unit LMF, the LMF completes the positioning calculation based on the first positioning measurement value and the second positioning measurement value, and obtains the positioning measurement calculation result and/or terminal position information, the terminal receiving the first information carrying positioning information sent by the network side device; the first information is at least one of message 2, message 4, and message B, and the positioning information in the first information includes positioning measurement calculation result and/or terminal position information.

Optionally, the second network device is a terminal, the processor 1200 adopts the uplink positioning method and based on terminal positioning, the receiving the first information related to the random access process sent by the first network device, and sending second information related to the random access process, includes:

Sending, by the terminal, the preamble, message 3, message 5 or message A as an uplink positioning reference signal;

After the network side device measures the preamble, message 3, message 5 or message A, the terminal receives first information carrying positioning information sent by the network side device, the first information is at least one of message 2, message 4 and message B, the positioning information in the first information includes a positioning measurement value;

Sending, by the terminal, the second information including positioning information, the second information is message 3, message A or message 5, and the positioning information in the second information includes positioning measurement calculation result and/or terminal position information.

Optionally, the second network device is a terminal, the processor 1200 adopts the downlink and uplink joint positioning method and based on terminal positioning, the receiving the first information related to the random access process sent by the first network device, and sending second information related to the random access process, includes:

Sending, by the terminal, the preamble, message 3, message 5 or message A as an uplink positioning reference signal;

Receiving, by the terminal, first information carrying positioning information sent by the network side device, the first information is message 2, message 4 or message B; the positioning information in the first information includes the first positioning measurement value;

After the terminal receives the message 2, message 4 or message B, obtains the first positioning measurement value, and obtains a second positioning measurement value by measuring the message 2, message 4 or message B; and completes the positioning calculation according to the first positioning measurement value and the second positioning measurement value, the terminal sending second information carrying positioning information, wherein the second information is at least one of message 3, message A, and message 5; the positioning information in the second information includes positioning measurement calculation result and/or terminal position information.

Figure 13:
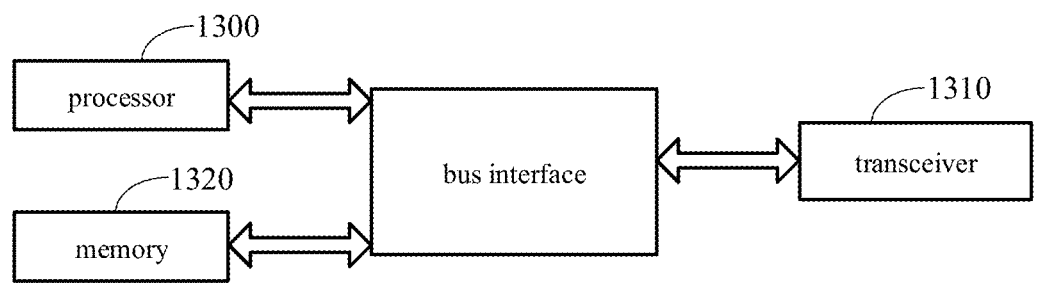
FIG. 13 is a fourth implementation of the network device described in the embodiment of the present disclosure.

An embodiment of the present disclosure also provides a network device, where the network device is a second network device. Optionally, the second network device is one of a terminal and a network side device, for example, the second network device is a network side device, as shown in FIG. 13, including a memory 1320, a transceiver 1310, and a processor 1300; the bus architecture may include any number of interconnected buses and bridges, specifically various circuits of one or more processors represented by processor 1300 and memory represented by memory 1320 are linked together. The bus architecture can also link together various other circuits such as peripherals, voltage regulators, and power management circuits, etc., which are well known in the art and therefore will not be further described herein. The bus interface provides the interface. The transceiver 1310 may be a plurality of elements, including a transmitter and a receiver, providing a unit for communicating with various other devices over transmission media, including wireless channels, wired channels, optical cables, and other transmission medium. The processor 1300 is responsible for managing the bus architecture and general processing, and the memory 1320 can store data used by the processor 1300 when performing operations.

The processor 1300 may be a CPU, ASIC, FPGA or CPLD, and the processor may also adopt a multi-core architecture.

Specifically, the memory 1320 is used to store computer programs; the transceiver 1310 is used to send and receive data under the control of the processor; the processor 1300 is used to read the computer programs in the memory and perform the following operations:

Receiving first information related to a random access process sent by a first network device, wherein the first information includes positioning information, and the first network device is one of a terminal and a network side device that is different from the second network device;

Wherein, the positioning information includes at least one of the following information:

an uplink positioning reference signal, configuration information of the uplink positioning reference signal, a downlink positioning reference signal, configuration information of the downlink positioning reference signal, a positioning measurement value, a positioning calculation result or terminal position information.

Optionally, the processor 1300 is further configured to:

Perform a terminal positioning process according to the positioning information.

Optionally, the second network device is a network side device, and for the first type of random access process, the first information is at least one of a preamble, message 3 and message 5 in the first type of random access process; for the second type of random access process, the first information is message A in the second type of random access process.

Optionally, the processor 1300 is further configured to:

Send second information related to the random access process, wherein the second information includes positioning information.

Optionally, the second network device is a network side device, and for the first type of random access process, the second information is at least one of message 2 or message 4 in the random access process; for the second type of random access process, the second information is message B in the second type of random access process.

Optionally, the second network device is a network side device, the position information includes at least one of the following:

The uplink positioning reference signal, the configuration information of the uplink positioning reference signal, the positioning measurement value, the positioning calculation result and the terminal position information.

Optionally, the second network device is a network side device, and the processor 1300 adopts a downlink positioning method and based on a network positioning, the receiving the first information related to the random access process sent by the first network device, and sending the second information related to the random access process, includes:

Receiving, by the network side device, first information carrying positioning information sent by the terminal after receiving the downlink positioning reference signal; the first information is at least one of message 3, message A and message 5, and the positioning information in the first information includes positioning measurement value;

After the position management function unit LMF completes the position calculation according to the positioning measurement value, and outputs the position measurement calculation result and/or the terminal position information, the network side device sends the second information carrying the position information; the second information is message 2, message 4 or message B; the positioning information in the second information includes positioning measurement calculation result and/or terminal position information.

Optionally, the second network device is a network side device, the processor 1300 adopts an uplink positioning method, and based on network positioning, the receiving the first information related to the random access process sent by the first network device, sending the second information related to the random access process, includes:

Receiving, by the network side device, first information sent by the terminal; the first information is a preamble, message 3, message 5 or message A, as an uplink positioning reference signal;

After the network side device measures the preamble, message 3, message 5 or message A, reports the positioning measurement value to the LMF, the LMF completes position calculation based on the positioning measurement value, and outputs the position measurement calculation result and/or the terminal position information, the network side device sending second information carrying positioning information, wherein the second information is at least one of message 2, message 4 and message B, and the positioning information in the second information includes positioning measurement calculation result and/or terminal position information.

Optionally, the second network device is a network side device, the processor 1300 adopts a downlink and uplink joint positioning method, and based on the network positioning, the receiving the first information related to the random access process sent by the first network device, sending the second information related to the random access process, includes:

Receiving, by the network side device, the first information carrying position information sent by the terminal; the first information is at least one of message 3, message A and message 5; the position information in the first information includes a first positioning measurement value;

After the network side device obtains the first positioning measurement value, obtains the second positioning measurement value through message 3, message A or message 5, and reports the first positioning measurement value and the second positioning measurement value to the LMF, the LMF completes the position calculation based on the first positioning measurement value and the second positioning measurement value, and obtains the position measurement calculation result and/or terminal position information, the network side device sending second information carrying positioning information; wherein the second information is at least one of message 2, message 4, and message B, and the positioning information in the second information includes positioning measurement calculation result and/or terminal position information.

Optionally, the second network device is a network side device, the processor 1300 adopts the downlink positioning method and based on terminal positioning, the receiving the first information related to the random access process sent by the first network device, includes:

Receiving, by the network side device, the first information carrying positioning information sent by the terminal; the first information is at least one of message 3, message A, and message 5, and the positioning information includes positioning measurement calculation result and/or terminal position information.

Optionally, the second network device is a network side device, the processor 1300 adopts the uplink positioning method and based on terminal positioning, the receiving the first information related to the random access process sent by the first network device, and sending second information related to the random access process, includes:

Receiving, by the network side device, the preamble, message 3, message 5 or message A sent by the terminal, and the preamble, message 3, message 5 or message A is used as an uplink positioning reference signal;

After the network side device measures the preamble, message 3, message 5 or message A, sending second information carrying positioning information, the second information is at least one of message 2, message 4 and message B, the positioning information in the second information includes a positioning measurement value;

Receiving, by the network side device, first information including positioning information sent by the terminal, the first information is message 3, message A or message 5, and the positioning information in the first information includes positioning measurement calculation result and/or terminal position information.

Optionally, the second network device is a network side device, the processor 1300 adopts the downlink and uplink joint positioning method and based on terminal positioning, the receiving first information related to the random access process sent by the first network device and sending the second information related to the random access process, includes:

Receiving, by the network side device, the preamble, message 3, message 5 or message A sent by the terminal, and the preamble, message 3, message 5 or message A being used as an uplink positioning reference signal;

Sending, by the network side device, second information carrying positioning information, where the second information is message 2, message 4, or message B; the positioning information in the second information includes a first positioning measurement value;

After the terminal receives the message 2, message 4 or message B, obtains the first positioning measurement value, and obtains a second positioning measurement value by measuring the message 2, message 4 or message B; and completes the positioning calculation according to the first positioning measurement value and the second positioning measurement value, the network side device receiving the first information carrying positioning information sent by the terminal, and the first information is at least one of message 3, message A and message 5; wherein, the positioning information in the first information includes positioning measurement calculation result and/or terminal position information.

The terminal or network side device provided by the embodiments of the present disclosure can realize all the method steps realized by the above-mentioned method embodiments, and can achieve the same technical effect. The same parts and beneficial effects of the method embodiments are described in detail.

Figure 14:
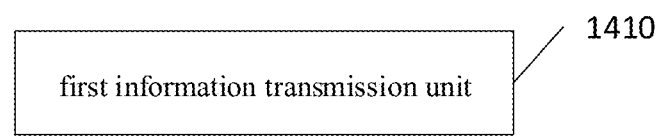
FIG. 14 is a first implementation of the positioning device described in the embodiment of the present disclosure.

As shown in FIG. 14, an embodiment of the present disclosure also provides a positioning device, which is applied to a first network device, where the device includes:

A first information transmission unit 1410, configured to send first information related to a random access process, wherein the first information includes positioning information;

The positioning information includes at least one of the following information:

an uplink positioning reference signal, configuration information of the uplink positioning reference signal, a downlink positioning reference signal, configuration information of the downlink positioning reference signal, a positioning measurement value, a positioning calculation result or terminal position information.

Optionally, in the positioning device, wherein the first network device is a terminal, and for the first type of random access process, the first information is at least one of the preamble and message 3 and message 5 in the first type of random access process; for the second type of random access process, the first information is message A in the second type of random access process.

Optionally, in the positioning device, wherein the first network device is a network side device, and for the first type of random access process, the first information is at least one of message 2 or the messages 4; for the second type of random access process, the first information is message B in the second type of random access process.

Optionally, in the positioning device, the first information transmission unit 1410 is further configured to:

receive second information related to the random access process sent by a second network device, wherein the second information includes positioning information; the second network device is one of a terminal and a network side device that is different from the first network device.

Optionally, in the positioning device, wherein the first network device is a network side device, and for the first type of random access process, the second information is at least one of a preamble, message 3 or message 5 in the first type of random access process; for the second type of random access process, the second information is message A in the second type of random access process.

Optionally, in the positioning device, wherein the first network device is a terminal, and for the first type random access process, the second information is at least one of message 2 and message 4; for the second type of random access process, the second information is message B in the second type of random access process.

Optionally, in the positioning device, the first information transmission unit 1410 is further configured to:

obtain first assistance data sent by the position management function unit LMF; the first assistance data includes configuration information of at least one of the preamble, message 3, message 5 and message A sent by the terminal during the random access process; and/or Obtain second assistance data sent by the LMF; the second assistance data includes configuration information of at least one of message 2, message 4, and message B sent by other network side devices during the random access process.

Optionally, in the positioning device, wherein the first network device is a terminal, when a downlink positioning method is adopted and based on a network positioning, the first information transmission unit 1410 sends the first information related to the random access process, receives second information related to the random access process sent by the second network device, including:

After receiving the downlink positioning reference signal, the terminal sending first information carrying positioning information; the first information is at least one of message 3, message A and message 5, and the positioning information in the first information includes the positioning measurement result;

After the LMF completes the position calculation according to the positioning measurement value, and outputs the position measurement calculation result and/or the terminal position information, the terminal receiving the second information carrying the position information sent by the network side device; the second information is message 2, message 4 or message B; the positioning information in the second information includes a positioning measurement calculation result and/or terminal position information.

Optionally, in the positioning device, wherein the first network device is a terminal, an uplink positioning method is used and based on network positioning, the first information transmission unit 1410 sends the first information related to the random access process, receiving second information related to the random access process sent by the second network device, including:

The terminal sending the first information; the first information is a preamble, message 3, message 5 or message A, as an uplink positioning reference signal;

After the network side device measures the preamble, message 3, message 5 or message A, reports the positioning measurement value to the LMF, the LMF completes the position calculation based on the positioning measurement value, and outputs the position measurement calculation result and/or the terminal position information, the terminal receiving second information carrying positioning information sent by the network side device, and the second information is at least one of message 2, message 4 and message B, the positioning information in the second information includes a positioning measurement calculation result and/or terminal position information.

Optionally, in the positioning device, wherein the first network device is a terminal, a downlink and uplink joint positioning method is used and based on network positioning, the first information transmission unit 1410 sends the first information related to the random access process, receiving second information related to the random access process sent by the second network device, including at least one of the following steps:

After receiving the downlink positioning reference signal, the terminal sending first information carrying positioning information; the first information is at least one of message 3, message A and message 5; the positioning information in the first information includes the first positioning measurement value;

After the network side device obtains the first positioning measurement value, obtains the second positioning measurement value through message 3, message A or message 5, and reports the first positioning measurement value and the second positioning measurement value to the LMF, the LMF completes the positioning calculation based on the first positioning measurement value and the second positioning measurement value, and obtains the positioning measurement calculation result and/or terminal position information, the terminal receiving the second information carrying positioning information sent by the network side device; the second information is at least one of message 2, message 4, and message B, and the positioning information in the second information includes the positioning measurement calculation result and/or terminal position information.

Optionally, in the positioning device, wherein the first network device is a terminal, when the downlink positioning method is adopted and based on terminal positioning, the first information transmission unit 1410 sends the first information related to the random access process, include:

After receiving the downlink positioning reference signal, the terminal sending the first information carrying positioning information; the first information is at least one of message 3, message A and message 5, and the positioning information includes the positioning measurement calculation result and/or the terminal position information.

Optionally, in the positioning device, wherein the first network device is a terminal, when the uplink positioning method is used and based on terminal positioning, the first information transmission unit 1410 sends the first information related to the random access process and receiving second information related to the random access process sent by the second network device, including:

The terminal sending a preamble, message 3, message 5 or message A as an uplink positioning reference signal;

After the network side device measures the preamble, message 3, message 5 or message A, the terminal receiving the second information carrying positioning information sent by the network side device, the second information is at least one of message 2, message 4 and message B, the positioning information in the second information includes a positioning measurement value;

The terminal sending the first information including positioning information, the first information is message 3, message A or message 5, and the positioning information in the first information includes positioning measurement calculation result and/or terminal position information.

Optionally, in the positioning device, wherein the first network device is a terminal, when downlink and uplink joint positioning is adopted, and based on terminal positioning, the first information transmission unit 1410 sends the first information related to the random access process, and receives second information related to the random access process sent by the second network device, including:

The terminal sending a preamble, message 3, message 5 or message A as an uplink positioning reference signal;

The terminal receiving the second information carrying positioning information sent by the network side device, the second information is message 2, message 4 or message B; the positioning information in the second information includes a first positioning measurement value;

After the terminal receives the message 2, message 4 or message B, obtains the first positioning measurement value, and obtains a second positioning measurement value by measuring the message 2, message 4 or message B; and completes the positioning calculation according to the first positioning measurement value and the second positioning measurement value, the terminal sending first information carrying positioning information, the first information is at least one of message 3, message A and message 5; wherein, the positioning information in the first information includes positioning measurement calculation result and/or terminal position information.

Optionally, in the positioning device, wherein the first network device is a network side device, and when a downlink positioning method is adopted and based on a network positioning, the first information transmission unit 1410 sends the first information related to the random access process, and receives second information related to the random access process sent by the second network device, including:

Receiving, by the network side device, second information including positioning information sent by the terminal; the second information is at least one of message 3, message A, and message 5; the positioning information in the second information is a positioning measurement value;

After the LMF completes the position calculation according to the positioning measurement value, and outputs the position measurement calculation result and/or the terminal position information, the network side device sending the first information carrying the position information; the first information is message 2, message 4 or message B; the positioning information in the first information includes positioning measurement calculation result and/or terminal position information.

Optionally, in the positioning device, wherein the first network device is a network side device, when an uplink positioning method is used and based on network positioning, the first information transmission unit 1410 sends the first information related to the random access process information, including:

When the terminal sends the preamble, message 3, message 5 or message A as the uplink positioning reference signal, after the network side device measures the preamble, message 3, message 5 or message A, and reports the positioning measurement value to the LMF, the LMF completes the positioning calculation based on the positioning measurement value, and outputs the positioning measurement calculation result and/or the terminal position information, the network side device sending the first information carrying the positioning information, and the first information is at least one of message 2, message 4, and message B, and the positioning information in the first information includes a positioning measurement calculation result and/or terminal position information.

Optionally, in the positioning device, wherein the first network device is a network side device, when a downlink and uplink joint positioning method is used and based on network positioning, the first information transmission unit 1410 sends the first information related to the random access process, including at least one of the following steps:

After the terminal receives the downlink positioning reference signal and sends at least one of message 3, message A, and message 5 including the first positioning measurement value, the network side device obtains the first positioning measurement value, and obtains the second positioning measurement value through message 3, message A or message 5, reports the first positioning measurement value and the second positioning measurement value to the LMF, the LMF completes the positioning calculation based on the first positioning measurement value and the second positioning measurement value, and obtains the positioning measurement calculation result and/or the terminal position information, the network side device sending the first information carrying the positioning information; the first information is at least one of message 2, message 4 and message B, the positioning information in the first information includes positioning measurement calculation result and/or terminal position information.

Optionally, in the positioning device, wherein the first network device is a network side device, when the uplink positioning method is adopted and based on terminal positioning, the first information transmission unit 1410 sends the first information related to the random access process, and receives second information related to the random access process sent by the second network device, including:

After the terminal sends the preamble, message 3, message 5 or message A as the uplink positioning reference signal, and the network side device measuring the preamble, message 3, message 5 or message A, the network side device sending the first information carrying the positioning information, the first information is at least one of message 2, message 4, and message B, and the positioning information in the first information includes a positioning measurement value;

The network side device receiving the second information including positioning information sent by the terminal, the second information is message 3, message A or message 5, and the positioning information in the second information includes positioning measurement calculation result and/or terminal position information.

Optionally, in the positioning device, wherein the first network device is a network side device, and when downlink and uplink joint positioning is adopted and based on terminal positioning, the first information transmission unit 1410 sends and receives the second information related to the random access process sent by the second network device, including:

After the terminal sends the preamble, message 3, message 5 or message A as the uplink positioning reference signal, the network side device sending the first information carrying positioning information, and the first information is message 2, message 4 or message B; the positioning information in the first information includes a first positioning measurement value;

After the terminal receives the message 2, message 4 or message B, obtains the first positioning measurement value, and obtains a second positioning measurement value by measuring the message 2, message 4 or message B; and completes the positioning calculation according to the first positioning measurement value and the second positioning measurement value, the network side device receiving the second information carrying positioning information sent by the terminal, and the second information is at least one of message 3, message A and message 5; wherein, the positioning information in the second information includes positioning measurement calculation result and/or terminal position information.

Optionally, in the positioning device, the positioning measurement value is a measurement value of base station RX-TX time difference.

Optionally, in the positioning device, the positioning measurement value is a measurement value of terminal RX-TX time difference.

Optionally, the positioning device, wherein the downlink positioning method includes at least one of a DL-TDOA positioning method, an OTDOA positioning method or a DL-AoD positioning method.

Optionally, the positioning device, wherein the uplink positioning method includes at least one of an UL-TDOA positioning method, an UTDOA positioning method or an UL-AoA positioning method.

Optionally, the positioning device, wherein the positioning measurement value includes at least one of ToA, TDoA, AoA, POA, RSTD, RTOA, terminal RX-TX time difference or base station RX-TX time difference.

Figure 15:
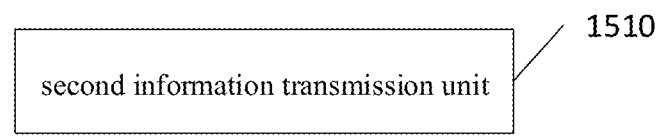
FIG. 15 is a second implementation of the positioning device according to the embodiment of the present disclosure.

As shown in FIG. 15, an embodiment of the present disclosure further provides a positioning device, which is applied to a second network device, including:

a second information transmission unit 1510, configured to receive first information related to a random access process sent by a first network device, wherein the first information includes positioning information, and the first network device is one of a terminal and a network side device that is different from the second network device;

Wherein, the positioning information includes at least one of the following information:

an uplink positioning reference signal, configuration information of the uplink positioning reference signal, a downlink positioning reference signal, configuration information of the downlink positioning reference signal, a positioning measurement value, a positioning calculation result or terminal position information.

Optionally, in the positioning device, the second information transmission unit 1510 is further configured to:

Perform a terminal positioning process according to the positioning information.

Optionally, in the positioning device, wherein the second network device is a network side device, and for the first type of random access process, the first information is at least one of a preamble, message 3 or message 5 in the first type of random access process, for the second type of random access process, the first information is message A in the second type of random access process.

Optionally, in the positioning device, wherein the second network device is a terminal, and for the first type of random access process, the first information is at least one of message 2 and message 4 in the first type of random access process; for the second type of random access process, the first information is message B in the second type of random access process.

Optionally, in the positioning device, the second information transmission unit 1510 is further configured to:

Send second information related to the random access process, wherein the second information includes positioning information.

Optionally, in the positioning device, wherein the second network device is a terminal, and for the first type of random access process, the second information is at least one of the preamble, message 3 and message 5 in the first type of random access process; for the second type of random access process, the second information is message A in the second type of random access process.

Optionally, in the positioning device, wherein the second network device is a network side device, and for the first type of random access process, the second information is at least one of message 2 or message 4 in the first type of random access process; for the second type of random access process, the second information is message B in the second type of random access process.

Optionally, in the positioning device, when the second network device is a network side device, the positioning information includes at least one of the following:

an uplink positioning reference signal, configuration information of the uplink positioning reference signal, a positioning measurement value, a positioning calculation result and terminal position information.

Optionally, in the positioning device, when the second network device is a terminal, the positioning information includes at least one of the following:

a downlink positioning reference signal, configuration information of the downlink positioning reference signal, a positioning measurement value, a positioning calculation result and terminal position information.

Optionally, in the positioning device, wherein the second network device is a network side device, and when a downlink positioning method is adopted and based on network positioning, the second information transmission unit 1510 receives the first information related to the random access process, sends the second information related to the random access process, including:

Receiving, by the network side device, first information carrying positioning information sent by the terminal after receiving the downlink positioning reference signal; the first information is at least one of message 3, message A and message 5, and the positioning information in the first information includes positioning measurement value;

After the LMF completes the position calculation according to the positioning measurement value, and outputs the position measurement calculation result and/or the terminal position information, the network side device sends the second information carrying the position information; the second information is message 2, message 4 or message B; the positioning information in the second information includes positioning measurement calculation result and/or terminal position information.

Optionally, in the positioning device, wherein the second network device is a network side device, when an uplink positioning method is used and based on network positioning, the second information transmission unit 1510 receives the first information related to the random access process sent by the first network device, and sends the second information related to the random access process, including:

Receiving, by the network side device, first information sent by the terminal; the first information is a preamble, message 3, message 5 or message A, as an uplink positioning reference signal;

After the network side device measures the preamble, message 3, message 5 or message A, reports the positioning measurement value to the LMF, the LMF completes position calculation based on the positioning measurement value, and outputs the position measurement calculation result and/or the terminal position information, the network side device sending second information carrying positioning information, wherein the second information is at least one of message 2, message 4 and message B, and the positioning information in the second information includes positioning measurement calculation result and/or terminal position information.

Optionally, in the positioning device, wherein the second network device is a network side device, a downlink and uplink joint positioning method is used and based on network positioning, the second information transmission unit 1510 receives the first information related to the random access process sent by the first network device, sends the second information related to the random access process, including:

Receiving, by the network side device, the first information carrying position information sent by the terminal; the first information is at least one of message 3, message A and message 5; the position information in the first information includes a first positioning measurement value;

After the network side device obtains the first positioning measurement value, obtains the second positioning measurement value through message 3, message A or message 5, and reports the first positioning measurement value and the second positioning measurement value to the LMF, the LMF completes the position calculation based on the first positioning measurement value and the second positioning measurement value, and obtains the position measurement calculation result and/or terminal position information, the network side device sending second information carrying positioning information; wherein the second information is at least one of message 2, message 4, and message B, and the positioning information in the second information includes positioning measurement calculation result and/or terminal position information.

Optionally, in the positioning device, wherein the second network device is a network side device, when the downlink positioning method is adopted and based on terminal positioning, the second information transmission unit 1510 receives the first information related to the random access process sent by the first network device, including:

Receiving, by the network side device, the first information carrying positioning information sent by the terminal; the first information is at least one of message 3, message A, and message 5, and the positioning information includes positioning measurement calculation result and/or terminal position information.

Optionally, in the positioning device, wherein the second network device is a network side device, when the uplink positioning method is adopted and based on terminal positioning, the second information transmission unit 1510 receives the first information related to the random access process sent by the first network device, sends the second information related to the random access process, including:

Receiving, by the network side device, the preamble, message 3, message 5 or message A sent by the terminal, and the preamble, message 3, message 5 or message A is used as an uplink positioning reference signal;

After the network side device measures the preamble, message 3, message 5 or message A, sending second information carrying positioning information, the second information is at least one of message 2, message 4 and message B, the positioning information in the second information includes a positioning measurement value;

Receiving, by the network side device, first information including positioning information sent by the terminal, the first information is message 3, message A or message 5, and the positioning information in the first information includes positioning measurement calculation result and/or terminal position information.

Optionally, in the positioning device, wherein the second network device is a network side device, and when downlink and uplink joint positioning is adopted and based on terminal positioning, the second information transmission unit 1510 receives the first information related to the random access process sent by the first network device, sends the second information related to the random access process, including:

Receiving, by the network side device, the preamble, message 3, message 5 or message A sent by the terminal, and the preamble, message 3, message 5 or message A being used as an uplink positioning reference signal;

Sending, by the network side device, second information carrying positioning information, where the second information is message 2, message 4, or message B; the positioning information in the second information includes a first positioning measurement value;

After the terminal receives the message 2, message 4 or message B, obtains the first positioning measurement value, and obtains a second positioning measurement value by measuring the message 2, message 4 or message B; and completes the positioning calculation according to the first positioning measurement value and the second positioning measurement value, the network side device receiving the first information carrying positioning information sent by the terminal, and the first information is at least one of message 3, message A and message 5; wherein, the positioning information in the first information includes positioning measurement calculation result and/or terminal position information.

Optionally, in the positioning device, wherein the second network device is a terminal, when a downlink positioning method is adopted and based on a network positioning, the second information transmission unit 1510 receives the first information related to the random access information sent by the first network device, and sends the second information related to the random access process include:

After receiving the downlink positioning reference signal, the terminal sending second information including positioning information; the second information is at least one of message 3, message A, and message 5; the positioning information in the second information is a positioning measurement value;

After the LMF completes the position calculation according to the positioning measurement value, and outputs the position measurement calculation result and/or the terminal position information, the terminal receiving the first information carrying the position information sent by the network side device; the first information is message 2, message 4 or message B; the positioning information in the first information includes a positioning measurement calculation result and/or terminal position information.

Optionally, in the positioning device, wherein the second network device is a terminal, when an uplink positioning method is used and based on network positioning, the second information transmission unit 1510 receives the first information related to the random access process sent by the first network device, including:

Sending, by the terminal, the preamble, message 3, message 5 or message A as an uplink positioning reference signal;

After the network side device measures the preamble, message 3, message 5 or message A, reports the positioning measurement value to LMF, the LMF completes the position calculation based on the positioning measurement value, and outputs the position measurement calculation result and/or the terminal position information, receiving, by the terminal, first information carrying positioning information sent by the network side device, wherein the first information is at least one of message 2, message 4, and message B, the positioning information in the first information includes a positioning measurement calculation result and/or terminal position information.

Optionally, in the positioning device, wherein the second network device is a terminal, a downlink and uplink joint positioning method is used and based on network positioning, the second information transmission unit 1510 receives the first information related to the random access process sent by the first network device, and sends the second information related to the random access process include:

Receiving, by the terminal, the downlink positioning reference signal, and sending second information including positioning information; the second information is at least one of message 3, message A, and message 5; the positioning information in the second information is the first positioning measurement value;

After the network side device obtains the first positioning measurement value, obtains the second positioning measurement value through message 3, message A or message 5, and reports the first positioning measurement value and the second positioning measurement value to the positioning management function unit LMF, the LMF completes the positioning calculation based on the first positioning measurement value and the second positioning measurement value, and obtains the positioning measurement calculation result and/or terminal position information, the terminal receiving the first information carrying positioning information sent by the network side device; the first information is at least one of message 2, message 4, and message B, and the positioning information in the first information includes positioning measurement calculation result and/or terminal position information.

Optionally, in the positioning device, wherein the second network device is a terminal, when the uplink positioning method is adopted and based on the terminal positioning, the second information transmission unit 1510 receives the first information related to the random access process sent by the first network device, and sends the second information related to the random access process include:

Sending, by the terminal, the preamble, message 3, message 5 or message A as an uplink positioning reference signal;

After the network side device measures the preamble, message 3, message 5 or message A, the terminal receives first information carrying positioning information sent by the network side device, the first information is at least one of message 2, message 4 and message B, the positioning information in the first information includes a positioning measurement value;

Sending, by the terminal, the second information including positioning information, the second information is message 3, message A or message 5, and the positioning information in the second information includes positioning measurement calculation result and/or terminal position information.

Optionally, in the positioning device, wherein the second network device is a terminal, and when downlink and uplink joint positioning is adopted and based on terminal positioning, the second information transmission unit 1510 receives the first information related to the random access process sent by the first network device, and sends the second information related to the random access process include:

Sending, by the terminal, the preamble, message 3, message 5 or message A as an uplink positioning reference signal;

Receiving, by the terminal, first information carrying positioning information sent by the network side device, the first information is message 2, message 4 or message B; the positioning information in the first information includes the first positioning measurement value;

After the terminal receives the message 2, message 4 or message B, obtains the first positioning measurement value, and obtains a second positioning measurement value by measuring the message 2, message 4 or message B; and completes the positioning calculation according to the first positioning measurement value and the second positioning measurement value, the terminal sending the second information carrying the positioning information, wherein the second information is at least one of message 3, message A, and message 5; the positioning information in the second information includes positioning measurement calculation result and/or terminal position information.

It should be noted that the division of units in the embodiment of the present application is for illustration, and is only a logical function division, and there may be another division manner in actual implementation. In addition, each functional unit in each embodiment of the present application may be integrated into one processing unit, each unit may exist separately physically, or two or more units may be integrated into one unit. The above-mentioned integrated units can be implemented in the form of hardware or in the form of software functional units.

If the integrated unit is implemented in the form of a software function unit and sold or used as an independent product, it can be stored in a processor-readable storage medium. Based on this understanding, the essence of the technical solution of the present disclosure or the part that contributes to the related art or all or part of the technical solution can be embodied in the form of a software product, and the computer software product is stored in a storage medium. Several instructions are included to make a computer device (which may be a personal computer, a server, or a network device, etc.) or a processor execute all or part of the steps of the methods described in the various embodiments of the present application. The aforementioned storage media include: U disk, mobile hard disk, read-only memory (ROM), random access memory (RAM), magnetic disk or optical disk and other media that can store program codes.

What needs to be explained here is that the above-mentioned device provided by the embodiment of the present disclosure can realize all the method steps realized by the above-mentioned method embodiment, and can achieve the same technical effect. The part and the beneficial effect are described in detail.

An embodiment of the present disclosure also provides a computer-readable storage medium, wherein the computer-readable storage medium stores a computer program, and the computer program is used to enable the processor to perform the above positioning method.

Those skilled in the art should understand that the embodiments of the present application may be provided as methods, systems, or computer program products. Accordingly, the present disclosure may take the form of an entirely hardware embodiment, an entirely software embodiment, or an embodiment combining software and hardware aspects. Furthermore, the present disclosure may take the form of a computer program product embodied on one or more computer-readable storage medium (including but not limited to disk storage and optical storage, etc.) having computer-readable program code therein.

The present disclosure is described with reference to flowcharts and/or block diagrams of methods, apparatus (systems), and computer program products according to embodiments of the present disclosure. It should be understood that each procedure and/or block in the flowchart and/or block diagrams, and combinations of procedures and/or blocks in the flowchart and/or block diagrams can be implemented by computer-executable instructions. These computer-executable instructions can be provided to a general purpose computer, special purpose computer, embedded processor, or processor of other programmable data processing device to produce a machine, such that instructions executed by the processor of the computer or other programmable data processing device, means for realizing the functions specified in one or more procedures of a flowchart and/or one or more blocks of a block diagram.

These processor-executable instructions may also be stored in a processor-readable memory capable of directing a computer or other programmable data processing device to operate in a specific manner, such that the instructions stored in the processor-readable memory produce a manufacturing product, the instruction device realizes the function specified in one or more procedures of the flow chart and/or one or more blocks of the block diagram.

These processor-executable instructions can also be loaded onto a computer or other programmable data processing device, causing a series of operational steps to be performed on the computer or other programmable device to produce a computer-implemented instructions, to provide steps for implementing the functions specified in the flow-chart procedure or procedures and/or block diagram procedures or blocks.

Those skilled in the art can clearly understand that for the convenience and brevity of the description, the specific working process of the above-described system, device and unit can refer to the corresponding process in the foregoing method embodiment, which will not be repeated here.

In the embodiments provided in the present disclosure, it should be understood that the disclosed devices and methods may be implemented in other ways. For example, the device embodiments described above are only illustrative. For example, the division of the units is only a logical function division. In actual implementation, there may be other division methods. For example, multiple units or components can be combined or integrated into another system, or some features may be ignored, or not implemented. In another point, the mutual coupling or direct coupling or communication connection shown or discussed may be through some interfaces, and the indirect coupling or communication connection of devices or units may be in electrical, mechanical or other forms.

The units described as separate components may or may not be physically separated, and the components shown as units may or may not be physical units, that is, they may be located in one place, or may be distributed to multiple network units. Part or all of the units can be selected according to actual needs to achieve the purpose of the solution of this embodiment.

In addition, each functional unit in each embodiment of the present disclosure may be integrated into one processing unit, each unit may exist separately physically, or two or more units may be integrated into one unit.

Those of ordinary skill in the art can understand that all or part of the processes in the methods of the above embodiments can be realized by controlling related hardware through a computer program, and the program can be stored in a computer-readable storage medium. During execution, it may include the processes of the embodiments of the above-mentioned methods. Wherein, the storage medium may be a magnetic disk, an optical disk, a read-only memory (ROM) or a random access memory (RAM), and the like.

It should be understood that the embodiments described in the embodiments of the present disclosure may be implemented by hardware, software, firmware, middleware, microcode or a combination thereof. For hardware implementation, modules, units, and subunits can be implemented in one or more application specific integrated circuits (ASIC), digital signal processor (DSP), digital signal processing device (DSPD), Programmable Logic Device (PLD), Field-Programmable Gate Array (FPGA), general-purpose processor, controller, microcontroller, microprocessor, other electronic units used to implement the disclosure or combinations thereof.

For software implementation, the technologies described in the embodiments of the present disclosure may be implemented through modules (such as procedures, functions, etc.) that execute the functions described in the embodiments of the present disclosure. Software codes can be stored in memory and executed by a processor. Memory can be implemented within the processor or external to the processor.

Obviously, those skilled in the art can make various changes and modifications to the present disclosure without departing from the spirit and scope of the present disclosure. In this way, if these change and modifications fall within the scope of the claims of the present disclosure and their equivalence, the present disclosure is also intended to include these change and modifications.

What is claimed is:

1. A positioning method, applied to a first network device, wherein the first network device is one of a terminal and a network side device, the positioning method includes:
   sending first information related to a random access process, wherein the first information includes positioning information;
   wherein the positioning information includes at least one of the following information:
   an uplink positioning reference signal, configuration information of the uplink positioning reference signal, a downlink positioning reference signal, configuration information of the downlink positioning reference signal, a positioning measurement value, a positioning calculation result or terminal position information;
   wherein when the first network device is the network side device and a downlink and uplink joint positioning method is used and based on network positioning, the sending first information related to a random access process includes:
   sending, by the network side device, the downlink positioning reference signal to the terminal;
   receiving, by the network side device, at least one of message 3, message A, or message 5 including a first positioning measurement value from the terminal;
   obtaining, by the network side device, the first positioning measurement value, and obtaining a second positioning measurement value through message 3, message A or message 5;
   reporting, by the network side device, the first positioning measurement value and the second positioning measurement value to a location management function unit (LMF), wherein the first positioning measurement value and the second positioning measurement value are used by the LMF for completing positioning calculation based on the first positioning measurement value and the second positioning measurement value and obtaining a positioning measurement calculation result and/or the terminal position information; and
   sending, by the network side device, the first information carrying the positioning information; wherein the first information is at least one of message 2, message 4 or message B, the positioning information in the first information includes the positioning measurement calculation result and/or the terminal position information.

2. The positioning method according to claim 1, wherein when the first network device is the terminal, and for a first type of random access process, the first information is at least one of a preamble, message 3 or message 5 in the first type of random access process; for a second type of random access process, the first information is message A in the second type of random access process.

3. The positioning method according to claim 1, wherein when the first network device is the network side device, and for a first type of random access process, the first information is at least one of message 2 or message 4 in the first type of random access process; for a second type of random access process, the first information is message B in the second type of random access process.

4. The positioning method according to claim 1, further comprising:
receiving second information related to the random access process sent by a second network device, wherein the second information includes at least one of the positioning information; the second network device is one of the terminal and the network side device that is different from the first network device.

5. The positioning method according to claim 4, wherein when the first network device is the network side device, and for a first type of random access process, the second information is at least one of a preamble, message 3, or message 5 in the first type of random access process; for a second type of random access process, the second information is message A in the second type of random access process.

6. The positioning method according to claim 4, wherein when the first network device is the terminal, and for a first type of random access process, the second information is at least one of message 2 or message 4 in the first type of random access process; for a second type of random access process, the second information is message B in the second type of random access process.

7. The positioning method according to claim 1, further comprising:
obtaining first assistance data sent by the LMF; wherein the first assistance data includes configuration information of at least one of the preamble, message 3, message 5 or message A sent by the terminal in the random access process; and/or
obtaining second assistance data sent by the LMF; wherein the second assistance data includes configuration information of at least one of message 2, message 4, or message B sent by other network side devices in the random access process.

8. The positioning method according to claim 4, wherein when the first network device is the terminal, when a downlink positioning method is used and based on network positioning, the sending the first information related to the random access process, and receiving the second information related to the random access process sent by the second network device includes:
after receiving the downlink positioning reference signal, sending, by the terminal, the first information carrying the positioning information; wherein the first information is at least one of message 3, message A or message 5, and the positioning information in the first information includes the positioning measurement value;
after the LMF completes position calculation according to the positioning measurement value, and outputs a positioning measurement calculation result and/or the terminal position information, receiving, by the terminal, the second information carrying the position information sent by the network side device; wherein the second information is message 2, message 4 or message B; the positioning information in the second information includes the positioning measurement calculation result and/or terminal position information.

9. The positioning method according to claim 4, wherein when the first network device is the terminal, an uplink positioning method is used and based on network positioning, the sending the first information related to the random access process, and receiving the second information related to the random access process sent by the second network device includes:
sending, by the terminal, the first information; wherein the first information is a preamble, message 3, message 5 or message A, as the uplink positioning reference signal;
after the network side device measures the preamble, message 3, message 5 or message A, reports the positioning measurement value to the LMF, the LMF completes the position calculation based on the positioning measurement value, and outputs the position measurement calculation result and/or the terminal position information, receiving, by the terminal, the second information carrying the positioning information sent by the network side device, wherein the second information is at least one of message 2, message 4 or message B, the positioning information in the second information includes the positioning measurement calculation result and/or terminal position information.

10. The positioning method according to claim 4, wherein when the first network device is the terminal, a downlink and uplink joint positioning method is used, and based on network positioning, the sending the first information related to the random access process, and receiving the second information related to the random access process sent by the second network device includes:
after receiving the downlink positioning reference signal, sending, by the terminal, the first information carrying positioning information; wherein the first information is at least one of message 3, message A or message 5; the positioning information in the first information includes a first positioning measurement value;
after the network side device obtains the first positioning measurement value, obtains a second positioning measurement value through message 3, message A or message 5, and reports the first positioning measurement value and the second positioning measurement value to the LMF, the LMF completes the positioning calculation based on the first positioning measurement value and the second positioning measurement value, and obtains the positioning measurement calculation result and/or terminal position information, receiving, by the terminal, the second information carrying the positioning information sent by the network side device; wherein the second information is at least one of message 2, message 4, or message B, and the positioning information in the second information includes the positioning measurement calculation result and/or terminal position information.

11. The positioning method according to claim 1, wherein when the first network device is the terminal, and a downlink positioning method is used and based on terminal positioning, the sending the first information related to the random access process, includes:
after receiving the downlink positioning reference signal, sending, by the terminal, the first information carrying the positioning information; wherein the first information is at least one of message 3, message A or message 5, and the positioning information includes the positioning measurement calculation result and/or the terminal position information.

12. The positioning method according to claim 4, wherein when the first network device is the terminal, and an uplink positioning method is used and based on terminal positioning, the sending the first information related to the random access process and receiving the second information related to the random access process sent by the second network device includes:

sending, by the terminal, a preamble, message 3, message 5 or message A as the uplink positioning reference signal;

after the network side device measures the preamble, message 3, message 5 or message A, receiving, by the terminal, the second information carrying the positioning information sent by the network side device, wherein the second information is at least one of message 2, message 4 or message B, the positioning information in the second information includes the positioning measurement value;

sending, by the terminal, the first information including the positioning information, wherein the first information is message 3, message A or message 5, and the positioning information in the first information includes the positioning measurement calculation result and/or the terminal position information.

13. The positioning method according to claim 4, wherein when the first network device is the terminal, and a downlink and uplink joint positioning is used and based on terminal positioning, the sending the first information related to the random access process, and receiving the second information related to the random access process sent by the second network device includes:

sending, by the terminal, a preamble, message 3, message 5 or message A as the uplink positioning reference signal;

receiving, by the terminal, second information carrying the positioning information sent by the network side device, wherein the second information is message 2, message 4 or message B; the positioning information in the second information includes a first positioning measurement value;

after the terminal receives message 2, message 4 or message B, obtains a first positioning measurement value, and obtains a second positioning measurement value by measuring message 2, message 4 or message B; and completes positioning calculation according to the first positioning measurement value and the second positioning measurement value, sending, by the terminal the first information carrying the positioning information, wherein the first information is at least one of message 3, message A or message 5; the positioning information in the first information includes the positioning measurement calculation result and/or the terminal position information.

14. The positioning method according to claim 4, wherein when the first network device is the network side device, a downlink positioning method is used and based on network positioning, the sending the first information related to the random access process, and receiving the second information related to the random access process sent by the second network device includes:

receiving, by the network side device, second information including the positioning information sent by the terminal; wherein the second information is at least one of message 3, message A, or message 5; the positioning information in the second information is the positioning measurement value;

after the LMF completes position calculation according to the positioning measurement value, and outputs the position measurement calculation result and/or the terminal position information, sending, by the network side device, the first information carrying the position information; wherein the first information is message 2, message 4 or message B; the positioning information in the first information includes the positioning measurement calculation result and/or the terminal position information.

15. The positioning method according to claim 1, wherein when the first network device is the network side device, an uplink positioning method is used and based on network positioning, the sending first information related to a random access process includes:

after the terminal sends a preamble, message 3, message 5 or message A as the uplink positioning reference signal, measuring, by the network side device, the preamble, message 3, message 5 or message A, and reporting the positioning measurement value to the LMF, the LMF completes positioning calculation based on the positioning measurement value, and outputs the positioning measurement calculation result and/or the terminal position information, sending, by the network side device, the first information carrying the positioning information, wherein the first information is at least one of message 2, message 4, or message B, and the positioning information in the first information includes the positioning measurement calculation result and/or the terminal position information.

16. The positioning method according to claim 4, wherein when the first network device is the network side device, and an uplink positioning method is used and based on terminal positioning, the sending the first information related to the random access process, and receiving the second information related to the random access process sent by the second network device includes:

after the terminal sends a preamble, message 3, message 5 or message A as the uplink positioning reference signal, and the network side device measures the preamble, message 3, message 5 or message A, sending, by the network side device, the first information carrying the positioning information, wherein the first information is at least one of message 2, message 4, or message B, and the positioning information in the first information includes the positioning measurement value;

receiving, by the network side device, second information including the positioning information sent by the terminal, wherein the second information is message 3, message A or message 5, and the positioning information in the second information includes the positioning measurement calculation result and/or the terminal position information;

or wherein when the first network device is the network side device, and a downlink and uplink joint positioning is used and based on terminal positioning, the sending the first information related to the random access process, receiving the second information related to the random access process sent by the second network device, includes:

after the terminal sends a preamble, message 3, message 5 or message A as the uplink positioning reference signal, sending, by the network side device, the first information carrying the positioning information, wherein the first information is message 2, message 4 or message B; the positioning information in the first information includes a first positioning measurement value;

after the terminal receives message 2, message 4 or message B, obtains the first positioning measurement value, and obtains a second positioning measurement value by measuring message 2, message 4 or message B; and completes positioning calculation according to the first positioning measurement value and the second positioning measurement value, receiving, by the network side device, the second information carrying the positioning information sent by the terminal, wherein the second information is at least one of message 3, message A or message 5; the positioning information in the second information includes the positioning measurement calculation result and/or the terminal position information.

17. A positioning method, applied to a second network device, wherein the second network device is one of a terminal and a network side device, the positioning method includes:

receiving first information related to a random access process sent by a first network device, wherein the first information includes positioning information, and the first network device is one of the terminal and the network side device that is different from the second network device;

wherein the positioning information includes at least one of the following information:

an uplink positioning reference signal, configuration information of the uplink positioning reference signal, a downlink positioning reference signal, configuration information of the downlink positioning reference signal, a positioning measurement value, a positioning calculation result or terminal position information;

sending second information related to the random access process, wherein the second information includes at least one of the positioning information;

wherein when the second network device is the terminal and a downlink and uplink joint positioning method is used and based on network positioning, the receiving first information related to a random access process sent by a first network device and the sending second information related to the random access process, includes:

receiving, by the terminal, the downlink positioning reference signal, and sending the second information including the positioning information; wherein the second information is at least one of message 3, message A, or message 5; the positioning information in the second information is a first positioning measurement value;

after the network side device obtains the first positioning measurement value, obtains a second positioning measurement value through message 3, message A or message 5, and reports the first positioning measurement value and the second positioning measurement value to a location management function unit (LMF), wherein the first positioning measurement value and the second positioning measurement value are used by the LMF for completing positioning calculation based on the first positioning measurement value and the second positioning measurement value and obtaining a positioning measurement calculation result and/or the terminal position information, receiving, by the terminal, the first information carrying the positioning information sent by the network side device; wherein the first information is at least one of message 2, message 4, or message B, and the positioning information in the first information includes the positioning measurement calculation result and/or the terminal position information.

18. The positioning method according to claim 17, wherein when the second network device is the network side device, and for a first type of random access process, the first information is at least one of a preamble, message 3 or message 5 in the first type of random access process; for a second type of random access process, the first information is message A in the second type of random access process.

19. The positioning method according to claim 17, wherein when the second network device is the terminal, and for a first type of random access process, the first information is at least one of message 2 or message 4 in the first type of random access process; for a second type of random access process, the first information is message B in the second type of random access process.

20. A network device, being a second network device, and comprising: a transceiver, a memory, a processor, and program instructions stored in the memory and executed by the processor; wherein, the transceiver receives and transmits data under the control of the processor, the program instructions in memory are read by the processor to perform the positioning method according to claim 17.

21. A network device, being a first network device, and comprising: a transceiver, a memory, a processor, and program instructions stored in the memory and executed by the processor; wherein, the transceiver receives and transmits data under the control of the processor, the program instructions in memory are read by the processor to perform the following steps:

sending first information related to a random access process, wherein the first information includes positioning information;

wherein the positioning information includes at least one of the following information:

an uplink positioning reference signal, configuration information of the uplink positioning reference signal, a downlink positioning reference signal, configuration information of the downlink positioning reference signal, a positioning measurement value, a positioning calculation result or terminal position information;

wherein when the first network device is a network side device and a downlink and uplink joint positioning method is used and based on network positioning, the sending first information related to a random access process includes:

sending, by the network side device, the downlink positioning reference signal to a terminal;

receiving, by the network side device, at least one of message 3, message A, or message 5 including a first positioning measurement value from the terminal;

obtaining, by the network side device, the first positioning measurement value, and obtaining a second positioning measurement value through message 3, message A or message 5;

reporting, by the network side device, the first positioning measurement value and the second positioning measurement value to a location management function unit (LMF), wherein the first positioning measurement value and the second positioning measurement value are used by the LMF for completing positioning calculation based on the first positioning measurement value and the second positioning measurement value and obtaining a positioning measurement calculation result and/or the terminal position information; and sending, by the network side device, the first information carrying the positioning information; wherein the first information is at least one of message 2, message 4 or message B, the positioning information in the first information includes the positioning measurement calculation result and/or the terminal position information.

* * * * *